US007886067B2

(12) United States Patent
Krassner et al.

(10) Patent No.: US 7,886,067 B2
(45) Date of Patent: Feb. 8, 2011

(54) INTERNET-BASED SYSTEM AND METHOD FOR DISTRIBUTING INTERSTITIAL ADVERTISEMENTS

(75) Inventors: Brad Krassner, Miami Beach, FL (US); Nikolai Mentchoukov, Miami Beach, FL (US); Alan Edwards, Miami Beach, FL (US)

(73) Assignee: Rich Hedia Club, LLC, Miami Beach, FL (US)

( * ) Notice: Subject to any disclaimer, the term of this patent is extended or adjusted under 35 U.S.C. 154(b) by 880 days.

(21) Appl. No.: 10/641,104

(22) Filed: Aug. 14, 2003

(65) Prior Publication Data

US 2005/0038900 A1 Feb. 17, 2005

(51) Int. Cl.
*G06F 15/16* (2006.01)

(52) U.S. Cl. .................. 709/231; 709/202; 709/203; 709/217; 709/218; 709/224; 709/229; 709/245; 705/10; 705/14.1; 705/26; 705/27; 715/713; 715/854

(58) Field of Classification Search ......... 709/202–203, 709/217–218, 224, 229, 231, 245; 705/10, 705/14, 26–27; 715/513, 854
See application file for complete search history.

(56) References Cited

U.S. PATENT DOCUMENTS

| 5,572,643 | A | | 11/1996 | Judson | |
|---|---|---|---|---|---|
| 5,708,780 | A | * | 1/1998 | Levergood et al. | 709/229 |
| 5,717,860 | A | * | 2/1998 | Graber et al. | 709/227 |
| 5,737,619 | A | | 4/1998 | Judson | |
| 5,740,549 | A | * | 4/1998 | Reilly et al. | 705/14 |
| 5,838,790 | A | * | 11/1998 | McAuliffe et al. | 713/176 |
| 5,848,396 | A | | 12/1998 | Gerace | |
| 5,937,390 | A | * | 8/1999 | Hyodo | 705/14 |
| 5,960,409 | A | * | 9/1999 | Wexler | 705/14 |
| 5,999,912 | A | * | 12/1999 | Wodarz et al. | 705/14 |
| 6,009,411 | A | * | 12/1999 | Kepecs | 705/14.17 |
| 6,011,537 | A | | 1/2000 | Slotznick | |
| 6,112,246 | A | * | 8/2000 | Horbal et al. | 709/230 |
| 6,119,165 | A | * | 9/2000 | Li et al. | 709/229 |
| 6,141,010 | A | * | 10/2000 | Hoyle | 715/854 |
| 6,167,382 | A | | 12/2000 | Sparks et al. | |

(Continued)

OTHER PUBLICATIONS

Grace, Jeremy, "Information and communication technologies and broad-based development of a partial review of the evidence," World Bank, Net Library, Inc., Wash., D.C.

*Primary Examiner*—Dohm Chankong
*Assistant Examiner*—Tauqir Hussain
(74) *Attorney, Agent, or Firm*—Greenberg Traurig, P.A.

(57) ABSTRACT

A system and method for use by website operators and advertisers to place interstitial advertisements on websites. The system uses an Internet dispatcher server and a mass storage device containing one or more databases storing advertisement command files pertaining to placements of advertisements that are stored in an advertisement server. The method comprises the steps of selecting ad files stored in a computer ad server, designating the url for the ad file, the url for the website page where the ad will be displayed, the url for the websites to which a user will be directed depending on the user's reaction to the advertisement, storing in a dispatcher server database a data string representing the ad placement commands with a url representing a dispatcher server-based application to execute said ad placement commands, and including said data string on said website for launching said dispatcher server command file.

35 Claims, 21 Drawing Sheets

U.S. PATENT DOCUMENTS

| | | | |
|---|---|---|---|
| 6,185,586 B1 * | 2/2001 | Judson | 715/513 |
| 6,205,432 B1 | 3/2001 | Gabbard et al. | |
| 6,243,865 B1 * | 6/2001 | Wei et al. | 725/41 |
| 6,268,856 B1 | 7/2001 | Bruck et al. | |
| 6,275,854 B1 * | 8/2001 | Himmel et al. | 709/224 |
| 6,314,451 B1 * | 11/2001 | Landsman et al. | 709/203 |
| 6,317,761 B1 * | 11/2001 | Landsman et al. | 715/513 |
| 6,347,398 B1 | 2/2002 | Parthasarathy et al. | |
| 6,466,967 B2 | 10/2002 | Landsman | |
| 6,516,338 B1 | 2/2003 | Landsman et al. | |
| 6,587,837 B1 | 7/2003 | Spagna et al. | |
| 6,654,539 B1 | 11/2003 | Duruoz et al. | |
| 6,693,649 B1 * | 2/2004 | Lipscomb et al. | 715/762 |
| 6,990,630 B2 * | 1/2006 | Landsman et al. | 715/500 |
| 7,120,590 B1 * | 10/2006 | Eisen et al. | 705/14.73 |
| 7,146,401 B2 | 12/2006 | Hansell et al. | |
| 7,155,508 B2 | 12/2006 | Sankuratripati et al. | |
| 7,313,590 B2 | 12/2007 | Mentchoukov | |
| 2002/0002491 A1 * | 1/2002 | Whitfield | 705/14 |
| 2002/0010631 A1 | 1/2002 | Sato et al. | |
| 2002/0016736 A1 | 2/2002 | Cannon et al. | |
| 2002/0063714 A1 | 5/2002 | Haas et al. | |
| 2002/0112005 A1 | 8/2002 | Namias | |
| 2002/0116494 A1 * | 8/2002 | Kocol | 709/224 |
| 2002/0120564 A1 | 8/2002 | Streitzel | |
| 2002/0124246 A1 * | 9/2002 | Kaminsky et al. | 725/9 |
| 2002/0141584 A1 | 10/2002 | Razdau et al. | |
| 2002/0147634 A1 | 10/2002 | Jacoby et al. | |
| 2003/0004804 A1 * | 1/2003 | Landsman et al. | 705/14 |
| 2003/0023488 A1 * | 1/2003 | Landsman et al. | 705/14 |
| 2003/0023489 A1 * | 1/2003 | McGuire et al. | 705/14 |
| 2003/0171985 A1 | 9/2003 | Prabhu et al. | |
| 2004/0117259 A1 * | 6/2004 | Morrisroe et al. | 705/14 |

* cited by examiner

Ipak Rich Media Interstitial Ad dispatcher Simple Sample

FIG. 4
Dispatcher Database

| Record | Link to Rich media Ad | Link to Go-to Page | Link to Click Go-to page. | Link to Click Go-to page. | Custom Parameter | Custom Parameter |
|---|---|---|---|---|---|---|
| 2 | | | | | | |
| 3 | | | | | | |
| 4 | | | | | | |
| 5 | | | | | | |

Ad Placement Process Flow

The website publisher fills in the registration form, enters user name and password and clicks "Save."

Thank you for registering screen appears. The publisher types his user name and password and then clicks "Log in"

The publisher selects desired Interstitial advertisement form menu.

Publisher enters "go to page" URL (where the ad directs the viewer after it plays through or skip is clicked.) and types a tracking ID and Clicks "Save."

Then advertiser target links (where the user will go to when the Interstitial is clicked) are added by entering the URL and the text to appear in the advertisement and clicking "Update."

The tracking screen will appear with the unique URL for the Interstitial created appearing in the (Ad's URL field.) The publisher than places this URL in the publisher's website as a link to a specific button.

When someone visits the publisher's website and clicks on this button...

...the viewer will be directed to the IPAK ad server and view the Interstitial.

If the viewer clicks on the Ipak interstitial they will be directed to the advertiser's website.

If no action is taken on the advertisement, or skip is clicked, the viewer is automatically directed to the "go to page" (The button they originally clicked, In this case "Shopping.")

When the publisher or advertiser goes back to the Ipak tracking screen, they will see accurate tracking statistics in real time. (Including but not limited to Impressions, clicks, click through rate and time of last impression.)

Ad Placement Model 1

Ad Placement Model 2

Revenue Stream Model

Multi-Level Advertising Business Method Process Flow

INTERNET-BASED SYSTEM AND METHOD FOR DISTRIBUTING INTERSTITIAL ADVERTISEMENTS

BACKGROUND OF THE INVENTION

A. Technical Field

The present invention relates generally to methods and systems for creation and distribution of promotional and informational communications regarding products and services via computer networks. More specifically, the present invention is an Internet-based system and method for distributing of interstitial advertisements, including advertisements comprising rich media files, providing real-time interstitial advertisement viewer activity tracking capability and including a relational database for storing data required for commands that execute selection, dispatching, tracking and display of said interstitial advertisement files previously stored in electronic format in a server. The present invention also relates to use of said system in a multi-level advertising business method that eliminates problems relating to the accurate tracking of sales attributable to advertisements placed on websites.

B. Background

Internet advertising is a multi-billion dollar industry inherently different from television and print advertising. Television advertising impressions are primarily served from networks such as ABC, NBC and CBS and their affiliates. Print publishing is dominated by established national and local periodicals and newspaper publishers. In contrast, the top ten mega portals, such as Yahoo and AOL, serve a minority of all Internet page views. The majority of Internet traffic is served from small special interest and personal websites that operate independently.

Prior art methods of deriving revenue from Internet advertising fall under two general approaches. The first is a pre-pay or billed cost per impression, or "CPM," or cost per click, or "CPC," model, wherein advertisers pay publishers to place their advertisement on a website according to the number of impressions served, or click actions taken on the advertisement. Usually these transactions are done through a third party agency who receives commissions based on a percentage agency discount offered by the publisher.

For the CPM/CPC model to work, a website with heavy traffic must agree to place an ad and that an advertiser will pay for with an established advertising budget. For this method to be effective, the mega portal or network must already be established with significant web traffic to offer advertisers, and an advertiser's budget must be available to offer website publishers to place the advertising.

The second method is a revenue share model. With this model a publisher places an advertisement on his/her website and is compensated with a percentage of the revenue from sales that results from traffic driven to the buy site from the advertisement. The advertiser is not required to pay fees when the ad is placed, but rather, when the add produces a sale.

Current revenue share compensation methods are basically flawed in that their verification methods essentially boil down to trust. The methods for tracking of receipt of and responses to advertisements used in prior systems have addressed in a relatively inefficient manner. Typically, tracking of Internet-based advertising and user responses to same is accomplished by redirecting a user's response. First, a connection is established with a tracking system that records the user's response to the URL of the selected ad or link, and then, the destination IP address URL is provided. If an advertisement placed on a website delivers a customer to a different website for purchase, there is no way for the website in which the advertisement is placed to know for sure what has happened once the user arrives at that buy site. The website in which the advertisement is placed has no way to know for sure and if it is being compensated properly. In addition, the customer may visit the buy site later, making a purchase that would not be linked to the advertisement placed on the other website.

With most Internet advertising revenue models, payments are often tied to a function of the number of web users whom the ad reached. But with web advertisements, accurately ascertaining that number has been difficult and problematic at best, and, given a basic technique employed to do so, relatively error-prone, causing erroneous counts and ad charges. Ads are usually logged as a "user impression" at a web server when the file is served rather than after the browser has completely rendered the advertisement to the user. Serving the ad files does not guarantee that the files will be ultimately and completely rendered by the user's browser. As a result, web server generated "user impression" counts can be grossly over- or under-stated. If a user navigates to a new content page after an advertisement has started playing but before that advertisement completes and, by doing so, prematurely terminated the advertisement, a full impression is nevertheless logged—erroneously—since that advertisement was completely served. Additional errors arise if a proxy server is situated between multiple user computers situated on an intranet or a local area network and a web advertisement server situated on the Internet. In this case, a request from one of the website user computers for the advertisement files will be routed to the proxy server, which, in turn, will direct that request onward to the advertisement web server. The advertisement server serves one complete copy of the advertisement files to the proxy server. The resulting retrieved advertisement files will be locally cached in the proxy server and, from there, provided to the requesting user's computer. Should any of the other user's computers request the same files, the proxy server will provide these files, totally unbeknownst to the advertisement server, from its local cache rather than directing a request from that other user computer back to the advertisement server. Hence, the advertisement server will be totally oblivious to each additional instance in which the proxy server accessed the ad files from its local cache and disseminated the advertisement to any user's computer other than that which first requested the ad. Proxy servers can therefore result in significant under-counting and under-charges to the advertiser. In order for Internet advertisements to effectively generate revenue as an on-going stream of payments to the host of the ads, accurate user accounting is essential to ensure that an advertiser is not over- or under-charged given an extent to which an ad is actually disseminated.

Users of the Internet typically rely on robust applications, such as web browsers and browser technology, to handle and maintain the transfer of information between systems. Existing applications to communicate with a user via the Internet are based on the following two methods:

1) Using an Internet browser (such as Netscape and Internet Explorer, for example) that is installed and run on the user's computer to communicate with a server.

2) Having the user download and install a custom application on the user's computer hard drive to communicate with the server.

In method 1), the Internet browser holds specific objects (such as, for example, the history object of the browser itself, or a custom object supported by the browser) which can be recognized by the desired web server.

In method 2), the custom application installed on the user's computer is used to communicate with the server.

In settings where the intent of the user is to use the browser or application, there is little question given to the issue of engaged system resources or bandwidth usage, as both are fundamental components to the primary activity engaged in by the user. The current practice of launching an additional browser window or dedicated application to accommodate the new media, initiate the connection, or transfer the information requires much more computer resources than are actually needed.

With prior art systems, customer and website computer resources are taxed in requiring the system to launch and maintain an additional application that may well exceed the necessary capabilities required for the desired communication and, in some cases, even the capabilities of the system itself. Additionally, as browsers and networked applications are continuously involved in two-way communication between the website user and website server systems involved in the communications, the bandwidth resources available to the communication effort are monopolized at a level, that although customary, are perhaps more than truly required.

Advertisers seeking to utilize the global reach of the Internet as an effective and efficient medium for disseminating advertisements to consumers have had to deal with various limitations in technology and methods. Internet advertisements are currently in forms ranging from static ads placed on space provided on website pages, links to ads or other websites, as well as banner ads, both static and animated. A banner advertisement is created by embedding specific HTML code for that banner within the HTML coding for a given web page in which the banner is to appear. A website user's browser, as it interprets and sequentially executes the HTML code for a selected page, will compile and execute the embedded code for the banner and display the banner as part of a rendered page and at a specified location thereon.

In implementing a banner, whether static or animated, the HTML coding is downloaded to a the website user's browser. The file may be stored on the same server that stores the HTML file for the web page, or accessed from a remote server. The file may contain a graphic itself, such as in a graphic interchange format or "GIF" file, or a Java applet which, once interpreted and executed by the browser, generates and renders the desired graphic. Such files require time to download and must be downloaded and assembled by the browser on the page prior to that page being fully rendered. Download times for large files, especially when the website user's system has relatively low communications bandwidth, can be long enough to lose the website user's interest. Users have to wait a considerable amount of time before all the page components for multimedia content are fully downloaded to permit that page to be rendered. Such delay during a page transition often results in the user prematurely terminating the download and transitioning to another web page. Advertisers therefore often limit the file size of their banner ads in order to minimize page download and hence latency times. Banners are for this reason often less effective than desired, as evidenced by relatively low user click-through counts generally observed for banner ads.

In an effort to overcome the limitations associated with banners, Internet advertisers have also used interstitial advertisements, which are pre-programmed advertisements that are displayed on websites during the interstitial period between when a website user clicks to access a new web page and when the selected web page is displayed to the user. Such advertisements often include a hotlink to enable the user to "click-through" the advertisement to access the website designated by the website advertiser. The length of an interstitial interval, which is variable, is governed by a variety of factors, including, but not limited to, the number of files required to fully render the new page and the size of each such file, network and server congestion and attendant delays occurring when users activate hotlinks. Prior patents in this field disclose the concept of embedding an advertisement as an information object in a web page file in such a manner that the object will remain hidden and will not be displayed when the file is executed to render the page. Rather than being displayed, the information object is locally cached by the website user's browser during execution of the code for that page. Then, during a transition initiated by website user activation of a hotlink to move from one web page to a next successive web page, referred to as an "interstitial period," the website user's browser accesses the advertisement from its local cache and displays it until such time as that next successive page is downloaded and rendered.

Other efforts have included "polite" downloading, which involves a browser on the website user's computer downloading from a remote advertising system server and ostensibly as a background process, file(s) for a web advertisement only during those intervals when bandwidth utilization of a communication channel connected to the browser is less than a pre-established threshold. Such "polite" downloading is intended to minimally interfere with other communication applications then executing on the website user's computer. The website user's browser displays the downloaded ad(s) to the user only after the user has not interacted with the website for a predefined period of time, such as by neither moving a mouse nor depressing a key on a keyboard during that period. The advertisement server selects those advertisements for downloading to the website user's computer based on a user-ID and preference information of the user and configuration information of the user's computer, which is uploaded from the website user's computer to the advertisement server when a connection is established between the website user's computer and the advertisement server. Though the files associated with an interstitial advertisement can be large, these files are advantageously referenced by the website user's browser during those intervals when the website user's browser is idle and bandwidth utilization of its network connection is relatively low.

By reducing limitations inherent in banners and engendered by download latency, prior forms of interstitial web advertisements, by employing idle time downloading and local caching, provide an improved capability to place advertisements comprising rich media content. However, interstitial advertisements as conventionally implemented continue to have practical deficiencies which limit their use.

Unlike banners, interstitial advertisements involve embedding HTML ad code, as a separate non-displayable object, within HTML coding for a web page. Unfortunately, this technique is inflexible and expensive for an advertiser to implement, especially when the advertiser, for whatever reason, seeks to modify ad content. Ad coding is manually inserted into each and every content web page that is to carry advertising. Consequently, insertion of increasingly sophisticated embedded advertising, such as rich media, in existing website content requires a large investment in terms of human resources, time and cost as websites, particularly large sites, increase a number of content pages available for advertising.

"Push" technology has also been used to attempt to improve on methods of placing and processing interstitial advertisements. A "push" application program on the website user's computer establishes a network connection with a "push" web server, typically during off-hours, such as in the late evening or early morning, or at a predefined interval. The "push" web server then downloads, or "pushes" to the push application advertisements and/or other predefined information that are to be played to the user sometime later. The "push" application stores all the "pushed" content files into a local database on a hard disk at the website user's computer and, in response to instructions received from the "push" web server, deletes those previously "pushed" content files which have already been displayed. The "push" application also maintains a user profile which specifies user preferences as to the specific advertising and/or other information the user wants to receive. As such, through each connection, the "push" web server, by selecting content from its database relative to preferences specified in the user profile, attempts to "push" fresh content to the user's computer without duplicating that which was already displayed. Stored "pushed" content is later displayed either on user demand or during those times when the user is not interacting with the system.

While "push" technology reduces download latency by shifting downloads to occur at off-hours this technology also has drawbacks which limit its practical acceptance. In particular, to access "pushed" content, a website user must initially download and install to the website user's computer a separate, platform-specific, software application program, as well as subsequent updates to that program as new push capabilities are released. These application programs can often require significant amounts of computer memory capacity. Since typical Internet users establish relatively slow modem connections to their Internet service providers, these users will find that downloading such relatively large program files, even in compressed form, will consume an inordinate amount of time and is generally impractical while the website user is actively using the user's computer. Downloading and then regularly updating a "push" application will reduce, sometimes considerably, the amount of disk space available to the website user on the user's computer. Furthermore, relatively few website users will undertake the effort of downloading and installing an application program to receive advertisements and other such information.

Other efforts to reduce the latency problems inherent in such internet advertisements have included development of various proprietary media formats. These formats employ increasingly sophisticated data compression, sometimes in conjunction with video and/or audio streaming. Rather than waiting for a media file to fully download prior to its being rendered, streaming permits content in a "streamed" media file to be presented in real-time to the website user as that content arrives at the website user's browser. While this approach clearly provides enhanced richness in content over that obtainable through a conventional banner, it requires a continuous real-time network connection existing to a remote web server. Any network or server congestion which stops the download, even if temporary, can suspend or halt the "streamed" media presentation to the website user prior to its completion. This interruption, if noticeable and sufficiently long, will likely frustrate the website user.

Still other efforts to address the shortcomings of interstitial advertisements in current forms have involved decoupling advertising content from a web content page, downloading advertising files through a browser executing at a website user's computer into browser caches at that computer and in a manner that is transparent to a user situated at the browser and interstitially displaying advertisements through the browser in response to a user click-stream associated with normal user navigation across different web pages. This technique relies on embedding an HTML tag into a referring page. The embedded tag contains two components. One component downloads from a server and then executes an agent implemented as a Java applet at the website user's browser. This agent then downloads advertising files, originating from an advertisement management system residing on a third-party advertisement server, for a given advertisement into the website user's browser disk or RAM cache and subsequently plays those media files through the browser on an interstitial basis and in response to a user click-stream. The other component is a reference, in terms of a web address, of the advertising management system from which the advertising files are to be downloaded. The ad management system selects the given advertisement that is to be downloaded, rather than having that selection or its content being embedded in the web content page. The agent operates independently of the content in any referring web page. Once loaded and started, the agent executes in parallel, with standard browser functionality, continually and transparently requesting and downloading advertisements to the website user's browser cache residing in a user's computer and interstitially playing those advertisements. In response to a user-initiated action which instructs the user's browser to transition to a next successive content web page and which signifies a start of an interstitial interval, the agent, if all the media and player files are then resident on the user's computer hard disk, plays the media files, through the browser and during that interstitial interval, directly from the browser cache. Advertisements are interstitially played typically in the order in which they were downloaded to the website user's browser. Interstitial play from the website user's browser cache advantageously permits previously cached rich advertisement content to be played through the website user's browser without adversely affecting communication link bandwidth then available to the user's browser. Thus, the full available link bandwidth can be used, while an advertisement is being played, to download a next successive content web page.

While this technique provides better capability to place and provide quick display of rich media advertisements, it still has the drawback of requiring storage of advertising files or agents on website user browser disk or RAM cache space. It also delivers ad files only in the order received. In view of the drawbacks associated with various web based advertising techniques known in the art, interstitial web advertising appears to hold the most promise of all these techniques. Yet, the limitations inherent in conventional implementations of interstitial advertising have effectively prevented this form of web advertising from effectively fulfilling its promise.

The present invention improves over prior interstitial advertising systems and methods. The present invention does not embed advertising HTML files within a web page, providing considerable economies to advertisers in saved labor, time and cost in terms of both inserting advertisements into web page files, and later changing any of those advertisements. The present invention functions totally transparently to a website user and which neither inconveniences nor burdens the user. The present invention does not require a website user to download or install on the website user's computer a separate application program specifically to receive web advertising or perform any affirmative act other than normal web browsing to receive such advertising. The present invention does not consume any browser hard disk or RAM space on the user's computer. The present invention also provides proper accounting to an advertiser by accurately and validly ascertaining user impressions of fully rendered advertisements. It also provides the capability to implement a multi-level advertising business method in which accurate tracking of sales attributable to advertisements placed on websites is assured.

The present invention accomplishes this by use of a dispatcher server that allows the system to isolate and manage a database of links to different pages on a website to a separate server (dispatcher server) database. That server basically allows the system users to link or connect pages in whatever order is desired and insert ad pages (interstitials) in between existing pages on a website. To envision this process, imagine pages on a website, but no links in between them—all links going to the dispatcher server that contains a database of page links for the website and knows how to find such pages (links) on the website. Because the website knows where all pages are it can show an ad (which is another page that may be stored somewhere else) and then jump to the next requested page on the website. In order to jump from the interstitial ad page to a specific page on the website, the dispatcher server, using a query string, passes variables (information) on this page location (and other parameters such as tracking parameters) to the ad file. The ad file can be rich media .swf file, but not necessarily—it can also be a regular HTML or ASP file that contains a timeout for viewing the ad content and a tag or the ability to jump to a destination page.

The present invention, in a preferred embodiment, uses file server direct connection technology to process ad viewer activity tracking data. This allows the system to send a tracking string with information (variables) received from the dispatcher server by the ad file directly to a tracking server. File Server Direct Connection, or "FSDC," is a method to establish a direct connection via the Internet between a self-contained file and a custom server-based application for online secured transactions, statistic tracking and server-based data sharing. FSDC uses a .swf file or alternately an HTML file, which can send a query string directly to the specific URL for a desired server without loading variables from the file (or html code) or requests to the history object of the user's Internet browser. The use of the Macromedia Flash file is preferred because of the ability to provide instructional code within the .swf, and because nearly all client computer systems have been enabled with the Flash player as a result of normal Internet browser configuration. It is to be understood that any type of file that is capable of operation without the initiation of an additional application could be used in place of Flash and the .swf file; however, presently, such is the preferred method of operation. As directed by its internal coding, the .swf ad file establishes a connection, via TCP/IP, with the specified server which is the tracking server, as discussed later. FSDC is described and claimed in the applicant's pending U.S. non-provisional patent application entitled "Method and System For File Server Direct Connection," application Ser. No. 10/316,431 filed on Dec. 11, 2002 and published on Jun. 26, 2003 (Publication No. 20030120727), the specification and figures of which are incorporated herein by reference. The coding of the .swf file establishes a connection to the tracking server so that a tabulation may be made, appropriately noting the response to the ad. As the communication to the tracking server is only made once the ad file has been opened, this is preferred over the prior art methodologies, which initiate the communication for tabulation prior to completing the link to the desired ad or site. In many cases, such tabulation is premature, as the user may close the window before the earlier desired material is delivered.

SUMMARY OF THE INVENTION

The present invention provides a system and method for the placement of interstitial advertisements in Internet websites. The system of the present invention includes software applications designed to give website publishers the ability to easily place interstitial advertisements online for easy placement on any website without outside assistance. The system of the present invention includes a relational database containing parameters and command files with a unique identifier for each interstitial ad that is available for placement in a website, including all necessary information to retrieve and run the interstitial ad from a remote server where the ad file is stored in electronic format, as well as to direct the viewer of the ad to the desired destination website page relating to said advertisement if the viewer desires to obtain more information regarding the advertisement, or to the next or previous designated web page. The relational database containing the ad placement parameters is stored in an ad dispatcher server which can be separate from the database and server providing the actual ad files.

The ad files themselves are preferably rich media files, preferably .swf, which is a Macromedia Flash format, that can be embedded to dynamic (such as ASP, PHP, .NET) or static HTML document. This is a smart rich media file that contains all necessary actions to play or to be skipped, to track all custom parameters and to load a go-to page when it is appropriate (for instance at the and of the ad or when it is skipped by user). The ad can be stored on any server connected to Internet. As long as the particular website knows the URL to the ad file in such ad server it can be placed in between any two pages on that website or another website. The ad files are preferably previously created and stored at an ad server ad database. The ad file can also be a regular HTML or .asp file that contains a timeout for viewing the ad content and tag or the ability to jump to a destination page, or any other type of file that is capable of operation without initiation of an additional application. The graphical user interface is stored preferably on the dispatcher server, and includes "thumbnails" or preview displays of the available ads and information regarding the location of the ad in order to easily identify and manage ads, but not necessarily the full ad file. It should be understood that the ad file can be stored and accessed from any server and that whichever server that may be is generally referred to as the "ad server."

The system is intended to be used by website operators and advertisers to place their own or third party advertisements on their own websites (and could also be used by website operators to post their own or third party advertisements on websites operated by others as well). The system's existence and operation is not apparent to the website user who is the intended viewer of the advertisements. The system serves the advertisement file in addition to tracking impressions and click through rates in real time while the advertisement runs.

The system is preferably made available to website operators and advertisers via a website for use by them after registering as a website advertisement administrator. Referring to FIG. 6, which shows the process flow of the advertising method implemented with the system of the present invention, a website operator/advertiser places an interstitial ad by executing the following steps: Registering with the system as a website advertisement administrator 300, logging into the system 310 and providing the uniform resource locator address for the website where the ads will be placed, selecting the ad by clicking on the "thumbnail" of the desired previously-created and stored electronic interstitial ad file via the system's ad menu screen provided in the system's graphical user interface, entering the uniform resource locator information for the desired "go to page" for the website advertisement viewer to access after the interstitial advertisement has played 320, which can be back to the website where the website user viewed the ad itself or any other designated website 330.

These items of information are then stored as the unique record in the database that can be retrieved and used by the dispatcher file (.asp, .php, .net or other file format) parameter command file for that particular ad placement 340.

After clicking "Save" in the system user screen when the above-referenced data is entered, a unique URL is generated that will demand the specific database record containing the specified custom parameters from the system's dispatcher server. This URL is then placed by the website operator in the website where the operator would like the interstitial advertisement to appear. This relational database entry also may contain custom parameters which, with the help of the FSDC tracking system, will pass tracking data relating to impressions and any actions (clicks on multiple parameters) taken on that particular advertisement for tracking and compilation for the website operator/advertiser's future reference. The present invention makes serving interstitial ads possible without any pre-loading technology required.

The present invention can be used to generate revenues through multi-level marketing approaches. Multi-level marketing distributors are not only motivated to sell retail from their personal online stores, but also to recruit distributors to join their down-line and sell from their personal online stores. In multi-level marketing, any product sales from a website in a website operator's down-line will result in a business volume commission paid to them. In turn the website that sells the product directly makes its own personal business volume commission. FIG. 20 depicts the sales revenue flow in such a multi-level advertising business method.

In a preferred embodiment, the tracking functions of the present invention are performed in a more efficient manner than prior art systems. Instead of redirecting a website user's request as discussed above, when a website user receives the interstitial advertisement using the present invention and in response clicks or requests a URL from the information provided, the website user is taken directly to the URL of interest, while a query string is independently sent to the system's tracking server from the ad file. The performance of the tracking server is not apparent to the website user and cannot affect the website user. The tracking data is more accurate and can represent several different customizable parameters sent from the destination file viewed rather than merely counting the number of requests. Furthermore, the use of independent connection processes insures that the website user's system and privacy is not further exposed to the tracking system. Within the context of server side data sharing, the present invention provides fast and efficient, predominantly one-way communication, without requiring storage of any files on a website user's computer system. The system, by utilizing FSDC for tracking directly establishes network connections between the ad file and the dispatcher server system where the tracking parameters and click-through destinations for interstitial advertisements are stored in the dispatcher server database by means of a single compiled file that does not require an additional network communications system such as a web browser or other supporting application. Specifically, a network connection is established to an encoded URL, and information is delivered to the tracking server in the form of a query string. Differing from a typical browser, or other typical network enabling software systems, the communication link established by the compiled file is predominantly one way and non-conversational. Impact on system resources is reduced as overhead support software is not required. Likewise bandwidth is conserved and issues of privacy are maintained as minimal information is exchanged without website user interaction or storage of files on the website user's computer memory.

By providing for TCP/IP communication over a network by means of a self-contained file that generates a non-conversational message directed to a server for storage and/or processing, the amount of unintended information transferred from the website user's system to the server system, and access to the website user's system from the server system (which may be unknowingly provided) is minimized or eliminated. It also provides the means and capability to rapidly provide interaction between the website user and the website by reducing the exchange of information to be as nearly one-way as possible, thus, conserving bandwidth resources and permitting greater speed in transfer and perceived interaction. The system and method of the present invention are partially based on the idea that some specific objectives on the Internet do not require a conversation between a user's computer and a server but can be achieved and even work better if the communication is one way from the user's computer to the server.

BRIEF DESCRIPTION OF THE DRAWINGS

FIG. 4 depicts a sample system dispatcher server database parameter file.

DESCRIPTION OF A PREFERRED EMBODIMENT OF THE INVENTION

Figure 1:
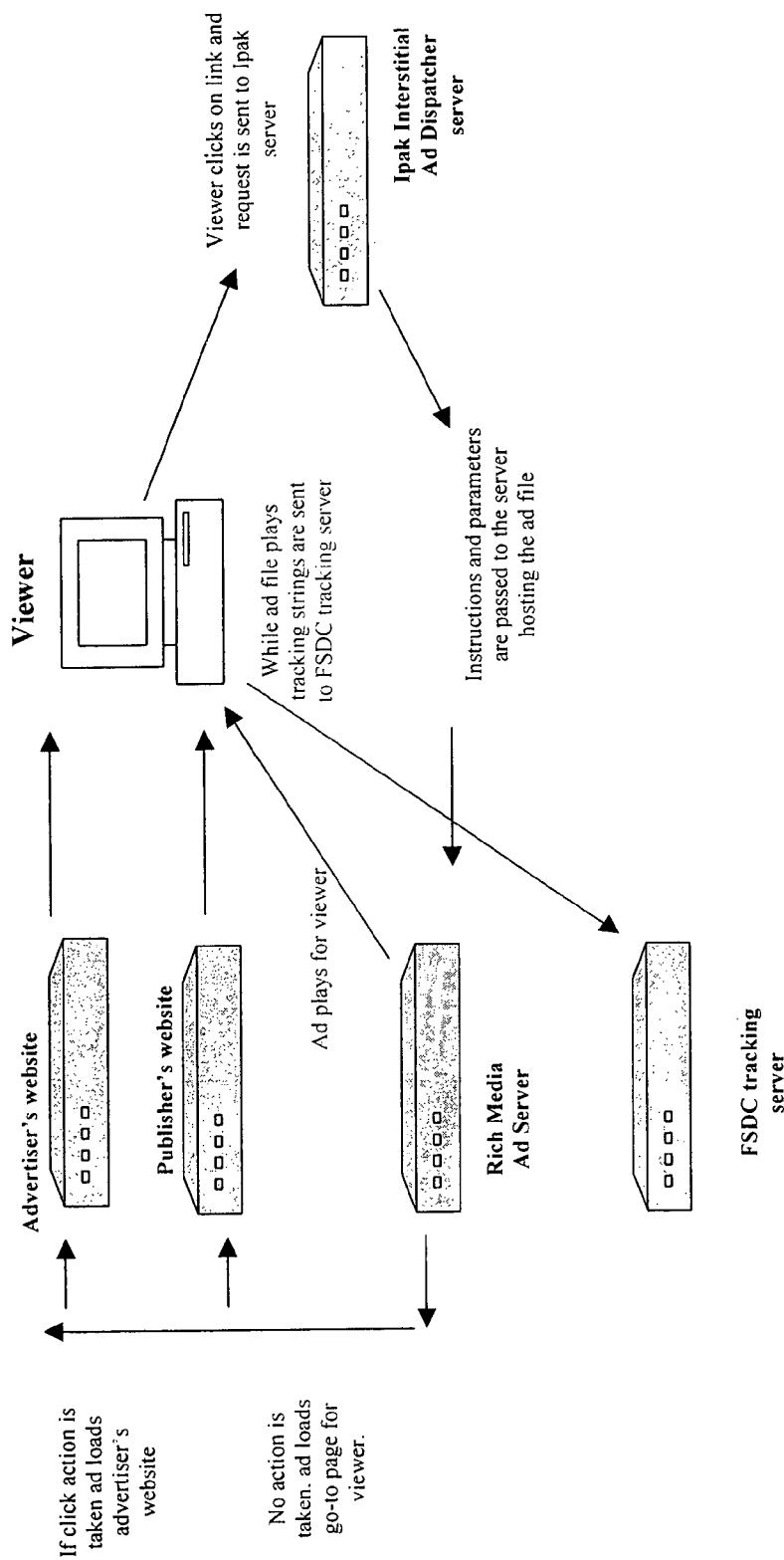
FIG. 1 is diagrammatical overview of the Internet communication flow of the present invention.

According to a preferred embodiment hereof, the present invention is a system and method for placement of interstitial advertisements on Internet websites.

The system of the present invention in a preferred embodiment comprises: a system-end computer equipped and configured for Internet communications, including computer processing means and one or more Internet communications interface software applications for interfacing with system users, also providing a menu screen for selection of interstitial ads and creating a record in a dispatcher server database that contains parameters and commands to be used by the dispatcher file to provide access to said interstitial advertisement files including the uniform resource locator address for the go-to web page(s) to which a website user is directed after said website user either clicks through or skips said advertisement, one or more advertisement servers configured and equipped for Internet communications communicating with said system-end dispatcher server and website user-end computer systems and having one or more advertisement files stored thereon, a website operator-end computer configured and equipped for Internet communications and communicating with said system dispatcher server and website user-end computer systems, a website user-end computer configured and equipped for Internet communications and communicating with said website and said advertisement server, and computer Internet communication means for displaying said interstitial advertisement to said website user directly from said advertisement server and then directing said website user to said specified go-to web pages depending on said website user's activity with respect to said advertisement.

The interface means, processor means and computer communications means can have various embodiments, including, without limitation, use of traditional Internet browser applications, whether customized for use in the present system or existing third party software applications to provide the interstitial advertisements to the user. In a preferred embodiment, the website page where the ad is desired contains a uniform resource locator indicator with a unique identifier attached to it of the record stored in the dispatcher server database to be retrieved and used by a dispatcher server-based application to provide access to said interstitial advertisement at the ad server. When website users click on this link, it transmits this identifier to the dispatcher server-based application and the dispatcher server-based application retrieves the requested record from the database and based on the retrieved data, loads the proper interstitial ad and passes all necessary information from the database into it. The record retrieved from the dispatcher server contains information for the purpose of tracking. That information can be passed to the interstitial ad via a data string that loads the ad and then can be used as part of the tracking string sent from the ad file.

The method of the present invention in a preferred embodiment comprises the steps of: selecting a record of data pertaining to one or more interstitial advertisement files previously stored in electronic file format in a mass storage device of a computer system having an advertisement server configured for Internet communications for placement on a website; storing the uniform resource locator address for the website location where said one or more selected advertisement files will be displayed as well as the uniform resource locator address for the go-to page(s) to which the website user will be directed after display of the selected advertisement depending on said advertisement viewer's activity with respect to said advertisement, and the uniform resource locator address for the advertisement file wherever it is stored, as well as tracking parameters in a dispatcher server-based database for use upon execution of the interstitial ad, assigning to said stored database record an identifier that is attached to a data string and placing that string on the website where the interstitial advertisement is desired, which, when clicked on by the website user, causes the website to communicate with the dispatcher server to retrieve the stored database record and use retrieved values in said data string and commands for said ad placement, which in turn communicates with the ad server to run the ad for the website user. The advertisement viewer is then directed to said go-to web page(s) depending on said advertisement viewer's activity with respect to said advertisement.

In a preferred embodiment, the interstitial advertisement is placed on the desired website as a URL with attached identifier of the specific record in the dispatcher server database. In this preferred embodiment, the website user, when an interstitial period occurs, can access and view the interstitial advertisements without having to download or cache any files on the website user's system. The transition to an interstitial period itself results in the dispatcher server-based application executing and providing access to the desired ad files from the ad server and passing values for tracking parameters retrieved from the record. Utilizing FSDC technology, the ad's custom tracking parameters as well as the website user's actions in clicking on the ad links provided is itself used as a tracking signal by the system and is saved in the related tracking database.

Figure 5:
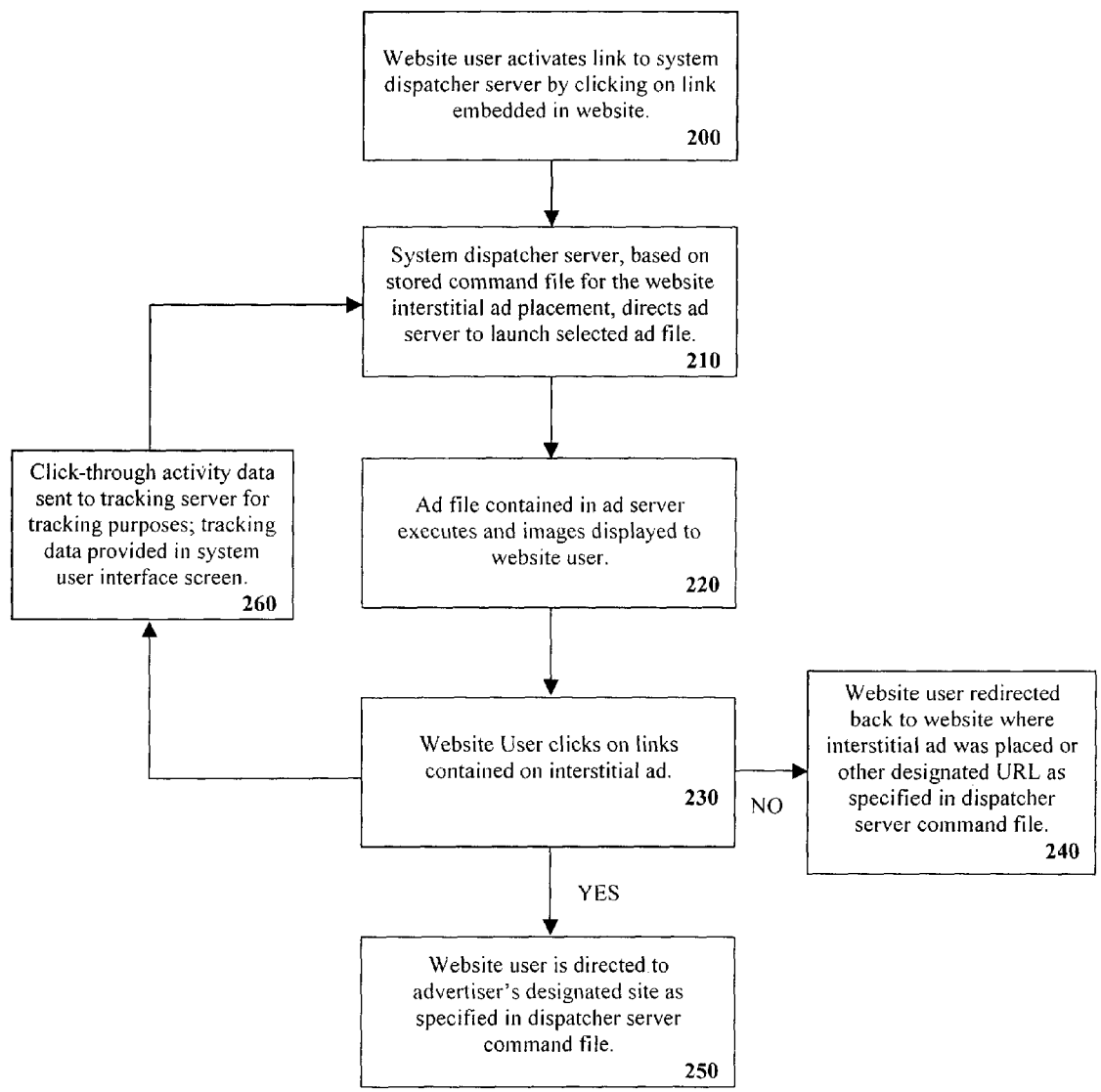
FIG. 5 is a flow diagram depicting website user interstitial click-through flow.
Figure 6:
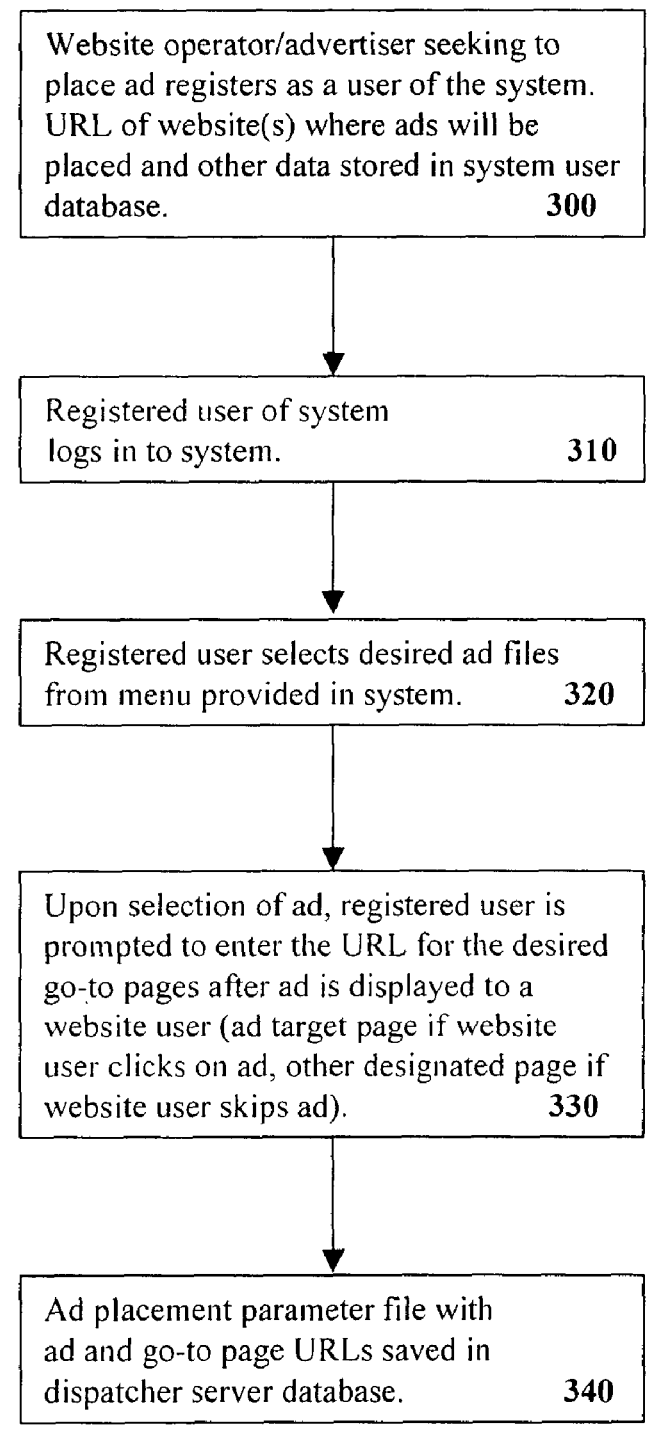
FIG. 6 depicts the steps taken by a website operator or advertiser to place an interstitial advertisement on a website using the present invention.

Referring now to FIG. 5, when a website user clicks on a web page link to retrieve the next desired web page, the link executes a request to the system's dispatcher server to retrieve a specific ad placement parameter file 200. The dispatcher server contains unique identifiers for that particular ad placement transaction stored in the database. The database can be in SQL Server format, or, alternatively, it can be in Oracle, Microsoft Access or any other server-based database format. The database stores the unique parameters for the particular interstitial ad placement. The stored information contains three components:

1. URL link to the interstitial ad to be shown before the go-to page (the ad file can be located on any server, but is preferably stored in a database in a separate ad server so that updating of ad files can be done separately from use of the system at one web location rather than on every website where the ad is placed).
2. URL link to go-to page which will be loaded right after the ad, or at the time user decide to ignore the ad and click a "skip" button.
3. Variables that hold custom parameters for tracking (as many as needed), including link(s) to click action target page or pages.

The dispatcher server, in response to the request, initiates the link to the ad file at the ad server and passes into it the following information: Link to go-to page and variables that contain custom tracking parameters 210. The ad then grabs this information from the query string and acts accordingly (displaying ad file 220 and sending tracking parameters to a tracking server using FSDC in a preferred embodiment).

The computer system used in the present invention is configured and equipped for Internet communications and, in addition to usual computer processing hardware comprises the following main components:

1. Dispatcher Server—having .asp .php or other files that execute the retrieval of requested records from the dispatcher server-based database, loads the ad for the website user and passes variables to the ad file.
2. Dispatcher server-based relational database containing the unique parameter record for each interstitial ad placement, and that may include a template action script for a flash file that can be used in any of the rich media ads stored in the ad server, and allows storing transactions for interstitials (combination of links to ad, destination page and custom parameters) and monitors in real-time ad viewer activity tracking information.
3. Password protected online user interface software that allows system users to create database records as above and monitor ad viewer activity with respect to ads.
4. Ad server and/or ad server-based interstitial advertisement files. This can be any server that holds the ad file.
5. FSDC tracking server—receives tracking data strings from the ad when ad is displayed to a website user.

Use of the System

Figure 8:
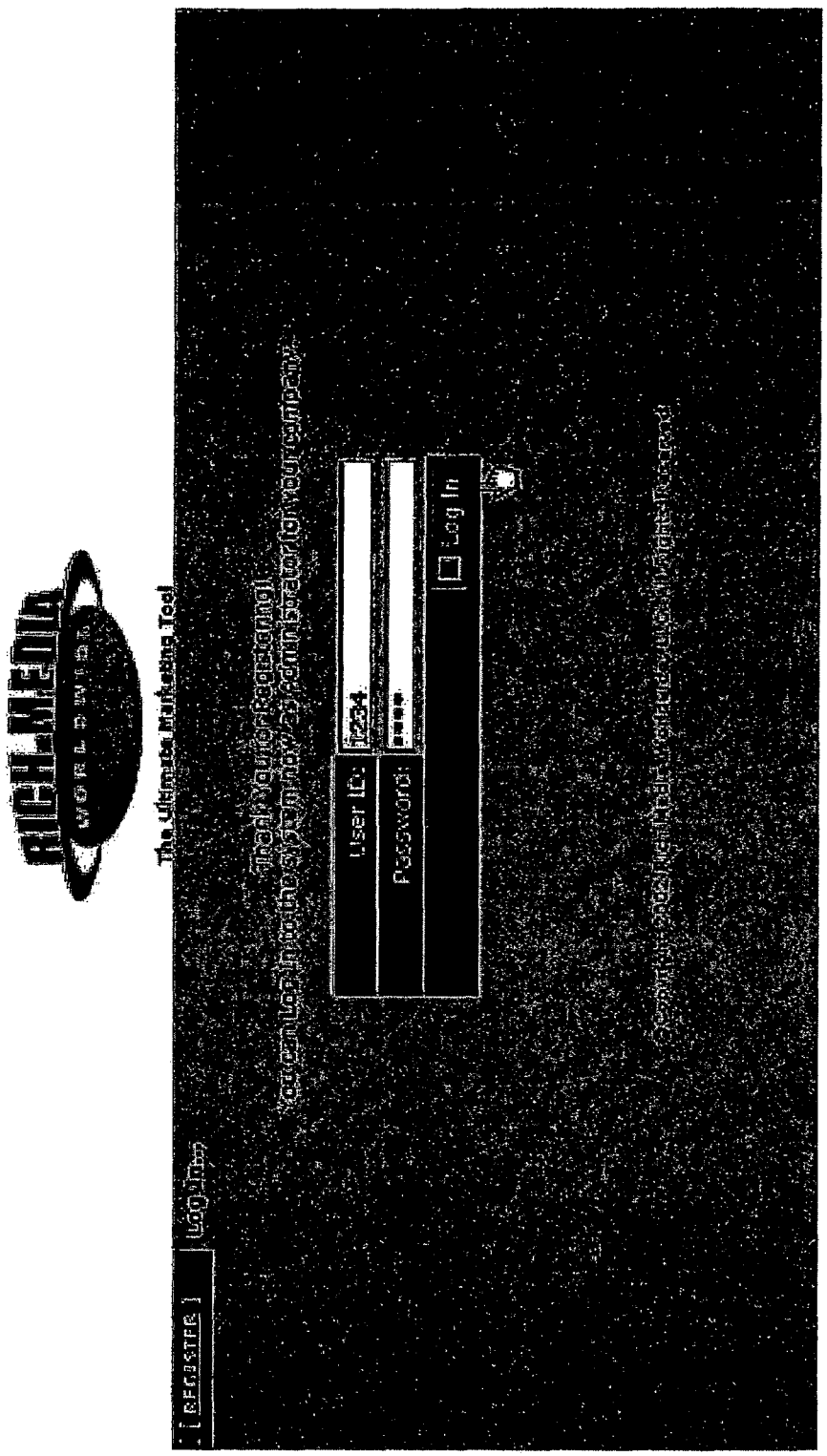
FIG. 8 depicts a sample system user log-in screen.

The users preferably contract with an Internet service provider for general Internet access and have a suitable Internet browser program on their computer system. Referring now to FIG. 8, users of the system, such as, for example, website advertisers and operators, can log on to the system site by entering a password. Once the user's password is validated, access is granted to the system and its dispatcher server and databases via a graphical user interface. The dispatcher server stores a menu of "thumbnails" of various rich streaming media interstitial advertisement files (which are saved preferably on one or more separate ad servers) that website operators can select to place on their own and/or other websites for delivery to website users, as well as a relational database storing advertisement placement transaction parameter/command data files. The system screens preferably provide a system user template for creating parameter/command file uniform resource locator address data strings for placement as a link on the website where the advertisement files are to be displayed to website users.

The system website operator/advertiser interface, in a preferred embodiment is based on (a) SQL server (which, alternately can be Oracle or Microsoft Access) database; (b) web-based interface generated by active server pages (written, for example, in Visual Basic) and (c) active server pages, Flash and ASP and XML-based applications to dynamically create a unique record in the database that contains data required to load the selected interstitial ad and to assign unique tracking parameters to it.

Figure 2:
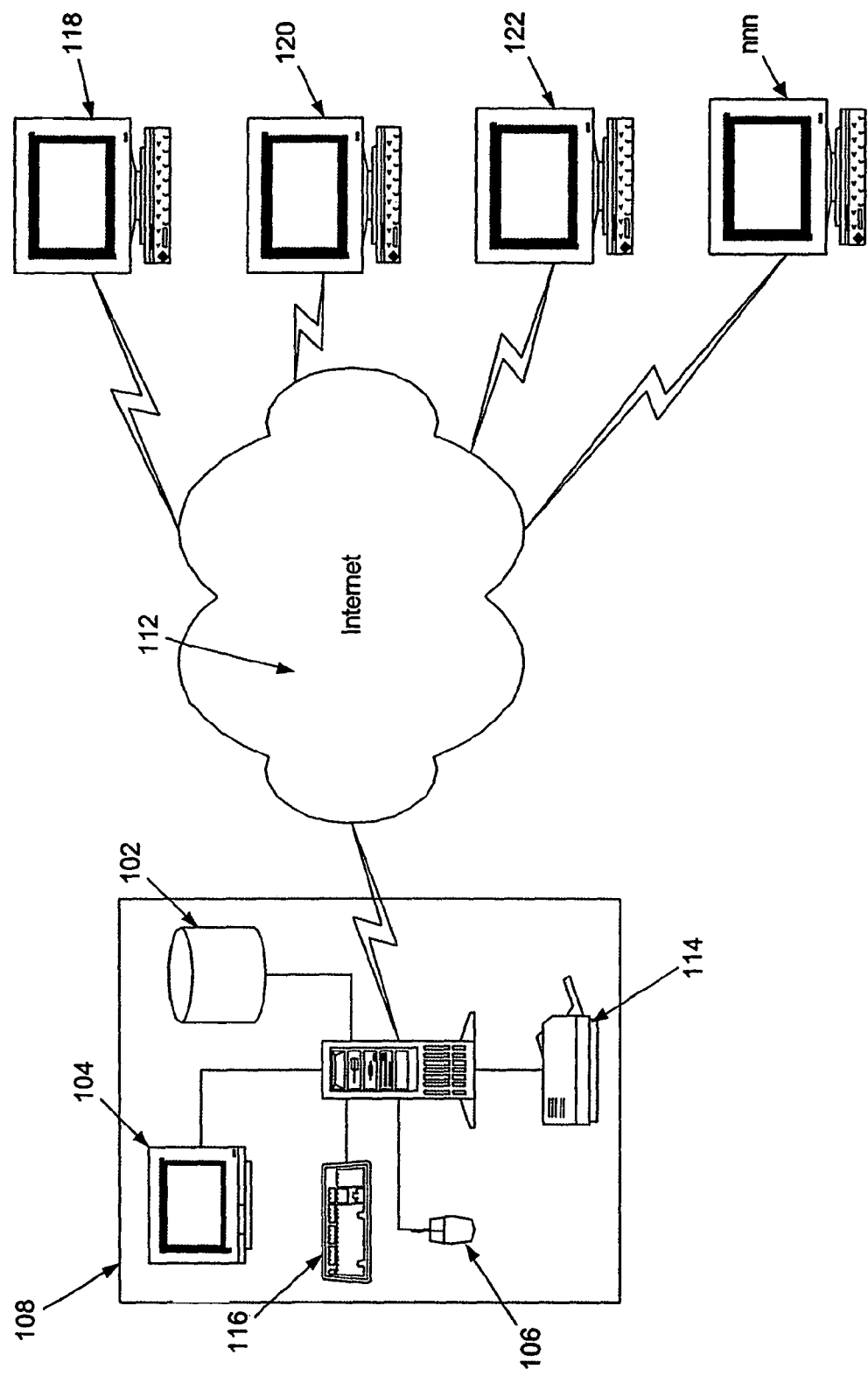
FIG. 2 is a diagrammatical representation of system components and their interrelationship.
Figure 3:
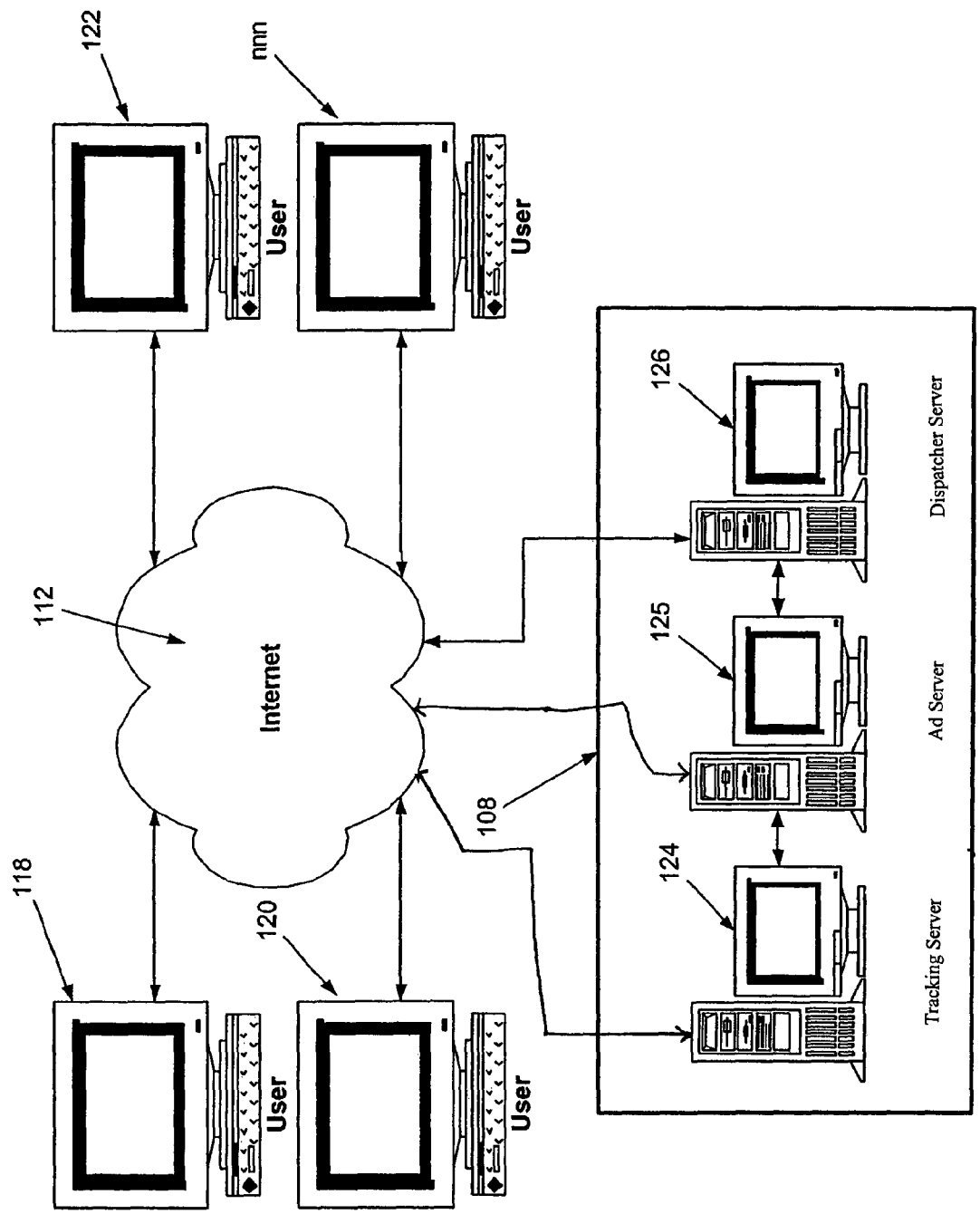
FIG. 3 is a diagrammatical overview of the relationship among system servers and website users utilizing the system of the present invention.

Referring now to FIGS. 2 and 3, an overview of a preferred embodiment of the present invention is shown. The present invention includes a system website operator/advertiser computer system 108. The computer system 108 comprises input and output devices, as is well-known in the art. For example, the computer system 108 preferably comprises a display screen or monitor 104, a keyboard 116, a printer 114, a mouse 106, etc. The computer system 108 is preferably connected to the Internet 112 that serves as the presently preferred communications medium. The Internet 112, as previously discussed, comprises a global network of networks and computers, public and private. The Internet 112 is the preferable connection method by system users 118, 120, 122 and nnn in preferred embodiments of the present invention. The website user/advertisement viewer's computer is preferably similar in its features.

Referring now to FIG. 3, the system-end computer 108 is shown. The computer system 108, in a preferred embodiment, comprises a dispatcher server 126, an ad server 125, and a tracking server (which can be the same as the dispatcher server) 124. The dispatcher server 126, ad server 125 and tracking server 124 preferably run in a variety of operating system environments, including MS Windows NT, MS Windows 2000, Linux and others, and preferably utilize a variety of database management systems, including MS SQL Server, Oracle and others.

Connectivity between the system user-end portion and the system-end and website user-end may be effected in various forms without violating the scope and spirit of the present invention. In particular, network connectivity may be made by a telephone line/modem combination as is well known in the art, a dedicated ISDN line or a cable modem-type set-top-box which provides for Internet connectivity through certain forms of cable television services. In each of the aforementioned cases, the computer of the website user-end portion will need to be provided with a suitable I/O card, such as a modem, ISDN card, and the like, in order to effect an appropriate interface with the network connection.

In application, the system provides for placement and delivery of interstitial advertisements as a compiled file. Preferably, this compiled file is a flash file identified by the .SWF suffix other html or other files can be used. The use of the Macromedia Flash file is preferred because of the ability to provide instructional code within the .swf file, and because nearly all customer computer systems have been enabled with the Flash player as a result of normal Internet browser configuration. It is to be understood that under the teachings of the present invention, any type of file that is capable of operation without the initiation of an additional application could be used in place of Flash and the .swf file and use of a .swf file is not a limitation of the present invention.

Referring to FIG. 1, under the present invention, the occurrence of the interstitial period activates the command file at the dispatcher server. As directed by its .asp file, the dispatcher server establishes a connection, via TCP/IP, with the specified ad server, and pulls Flash images (.swf file or HTML file in which .swf file is embedded) as for the desired advertisement file for presentation to the website user and passes into it parameters retrieved from the dispatcher server database.

Using data received from the dispatcher server, the coding of the .swf file establishes a connection to a tracking server which is preferably used to store and provide to system users website advertisement viewer activity tracking data. At the end of the ad, the coding of the .swf file loads the website go-to page address (URL) it received from the dispatcher server. On viewer interaction, such as via clicks, the coding of the .swf file establishes two substantially simultaneous connections, with one to the indicated tracking server for tracking purposes and the second is the actual link from the ad to the advertised content (click-through scenario).

The compiled program attaches a specific code element (which may be previously defined, or compiled with user supplied information) to a URL internally known to the system. This information is received from the user website by the dispatcher server, and parsed from the end of the URL by means commonly known and understood by those skilled in the art of network and database interaction. Based upon the returned information as parsed, the dispatcher server delivers the ad from the server it resides on directly to the website user.

A sample depiction of a database file stored in the system dispatcher server is provided in FIG. 4.

System Screens

FIGS. 7-17 depict representative samples of the system's graphical user interface screens, which provide a system user template for creating parameter/command file uniform resource locator address data strings for placement as a link on the website where the advertisement files are to be displayed to the website users.

Figure 7:
FIG. 7 depicts a sample system user registration screen.

FIG. 8 depicts a sample website operator/advertiser user login screen. Users who are registered with the system enter their user identification and password to access the system as depicted in FIG. 8. New operator users must register with the system by completing an online form as depicted in FIG. 7. Once logged in, website operator users are presented with a screen such as FIG. 9, which has various options, including edit user information, portfolio and tracking and add new advertisement.

Figure 9:
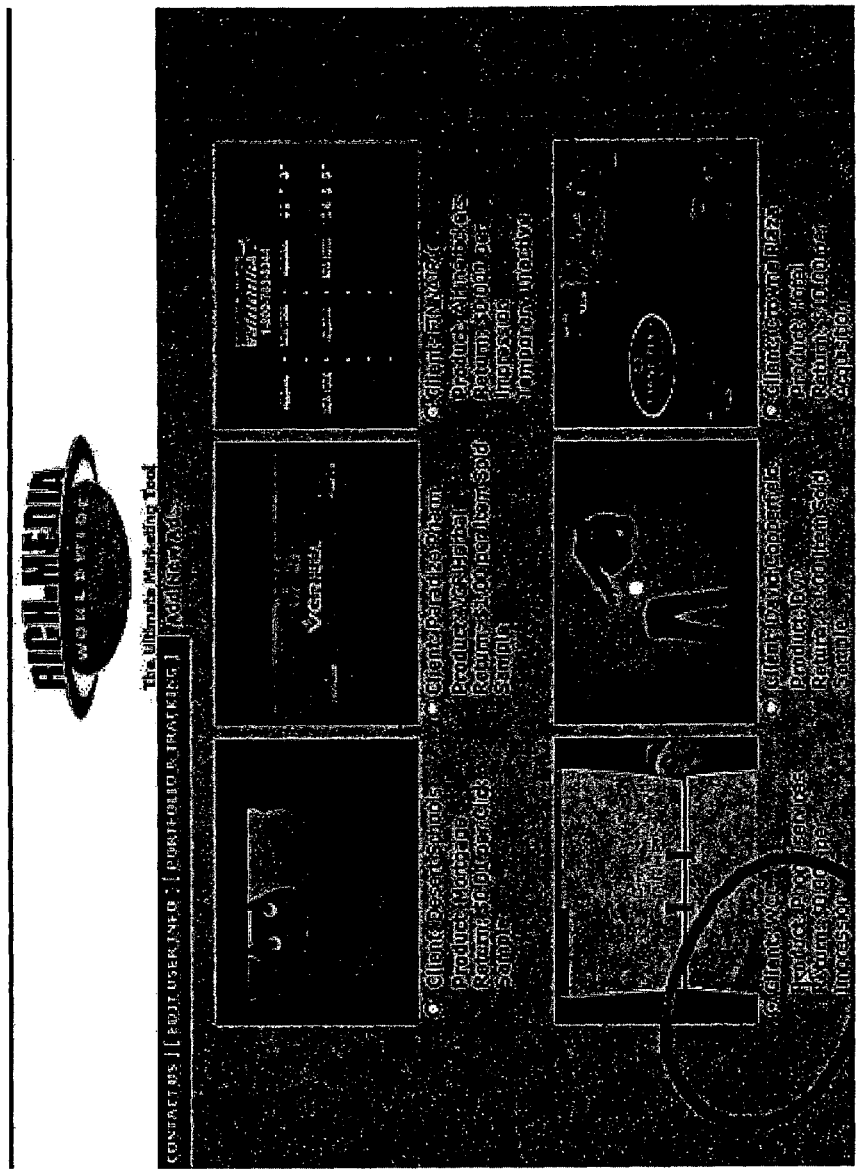
FIG. 9 depicts a sample interstitial advertisement menu selection screen.

Referring to FIG. 9, which depicts an interstitial advertisement file selection screen, where registered system users select interstitial advertisements for inclusion in desired websites. Categories of content files that are available for selection are preferably provided through the menus. Website operator users can select files as needed to create customized interstitial advertisements. The screens preferably indicate the owners of the advertisements, the products offered and the compensation terms offered for placing the ad on a website.

Figure 10:
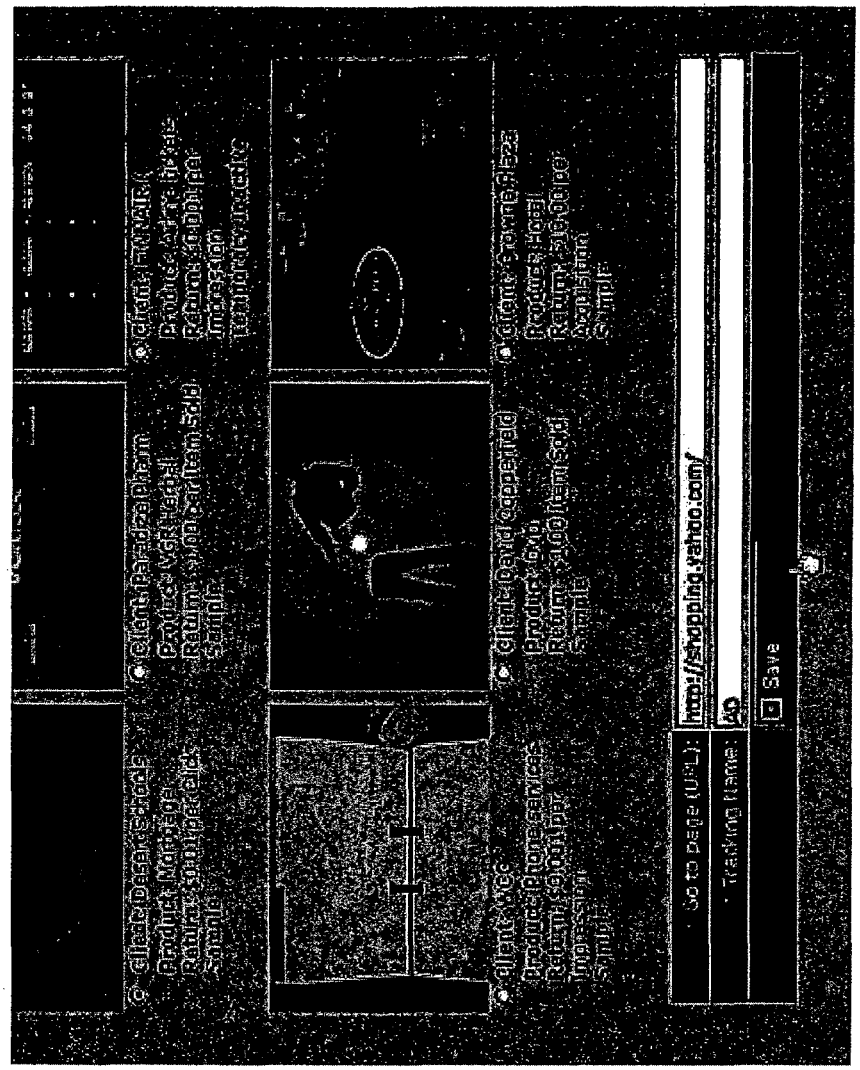
FIG. 10 depicts a sample interstitial advertisement menu selection screen including the "go-to" page URL entry section and "save" button.

Referring to FIG. 10, which depicts a sample interstitial advertisement selection screen where the system user is prompted to enter the uniform resource locator address for the "go-to" web page after the ad is viewed or skipped by the website user, the system user enters the information for the desired "go-to" page and then saves the parameters in the system's dispatcher server database by clicking on the save button.

Figure 11:
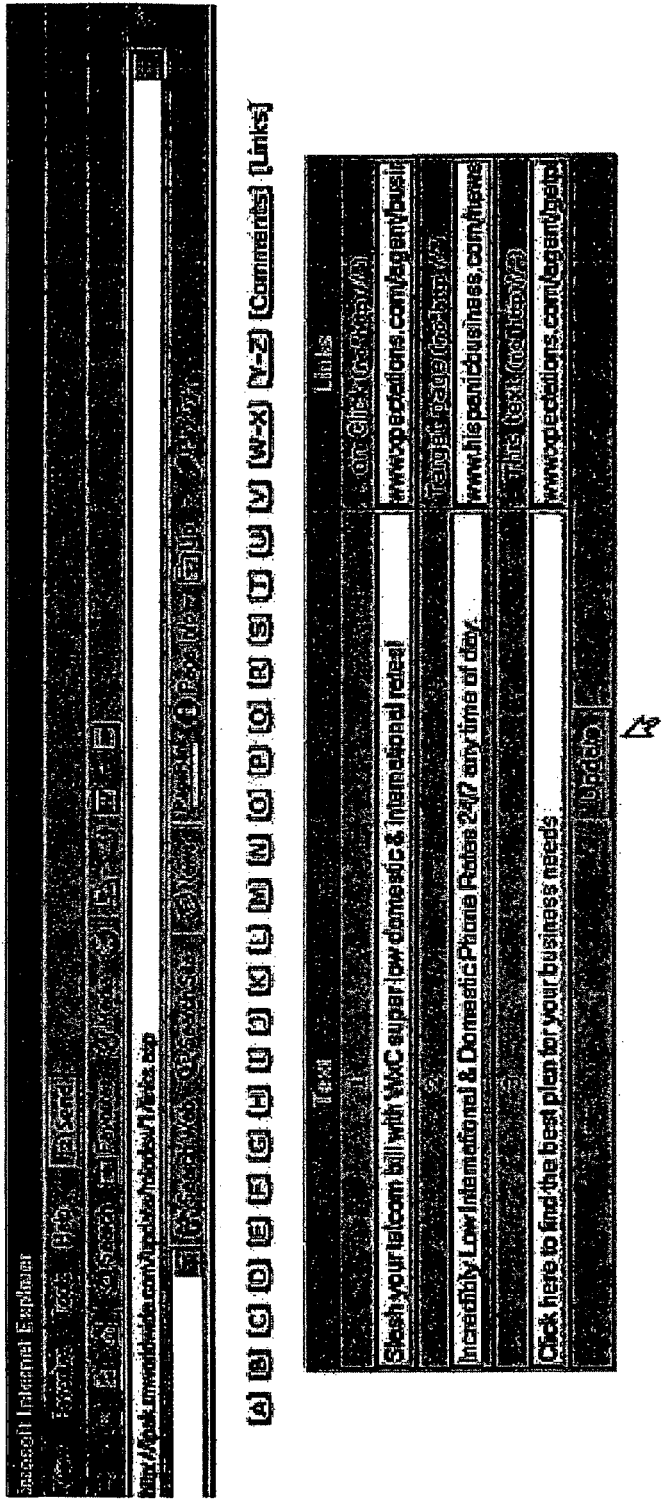
FIG. 11 depicts a sample system interstitial advertisement link text and destination URL entry screen.

Referring to FIG. 11, which depicts a sample ad link text and destination URL entry screen, the system user enters the uniform resource locator address for the desired advertiser web page to be presented to website users that click on the ad after it runs to obtain more information, as well as text to accompany the URL link for inclusion on the web page where the ad is placed.

Figure 12:
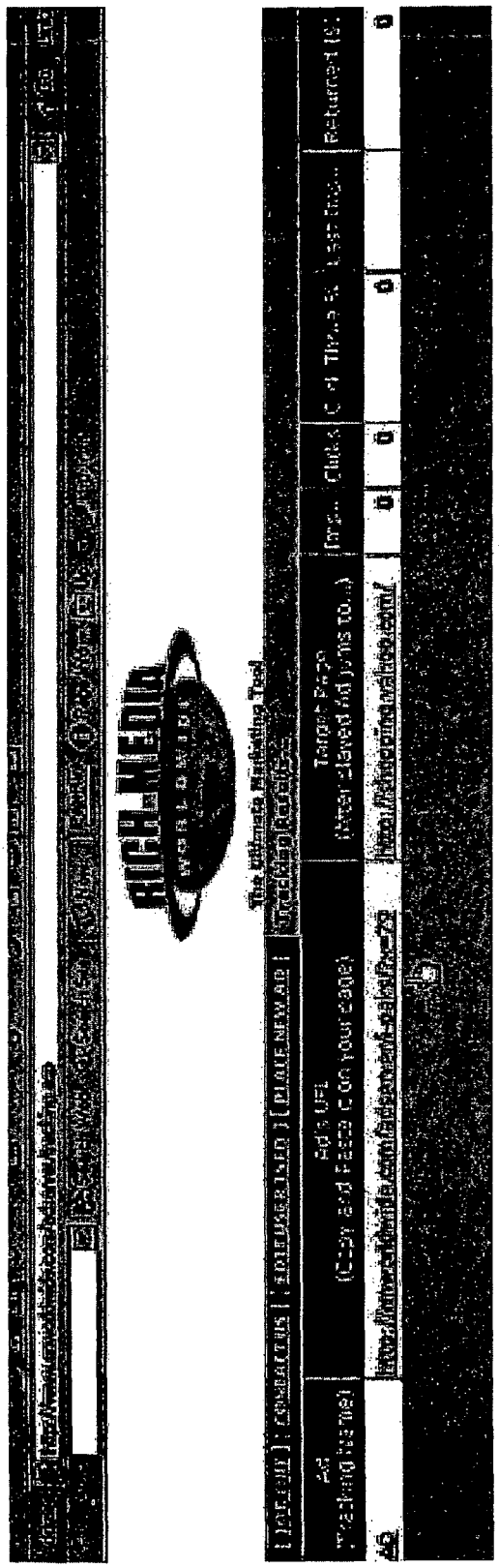
FIG. 12 depicts a sample system user interstitial advertisement click-through activity tracking screen.
Figure 13:
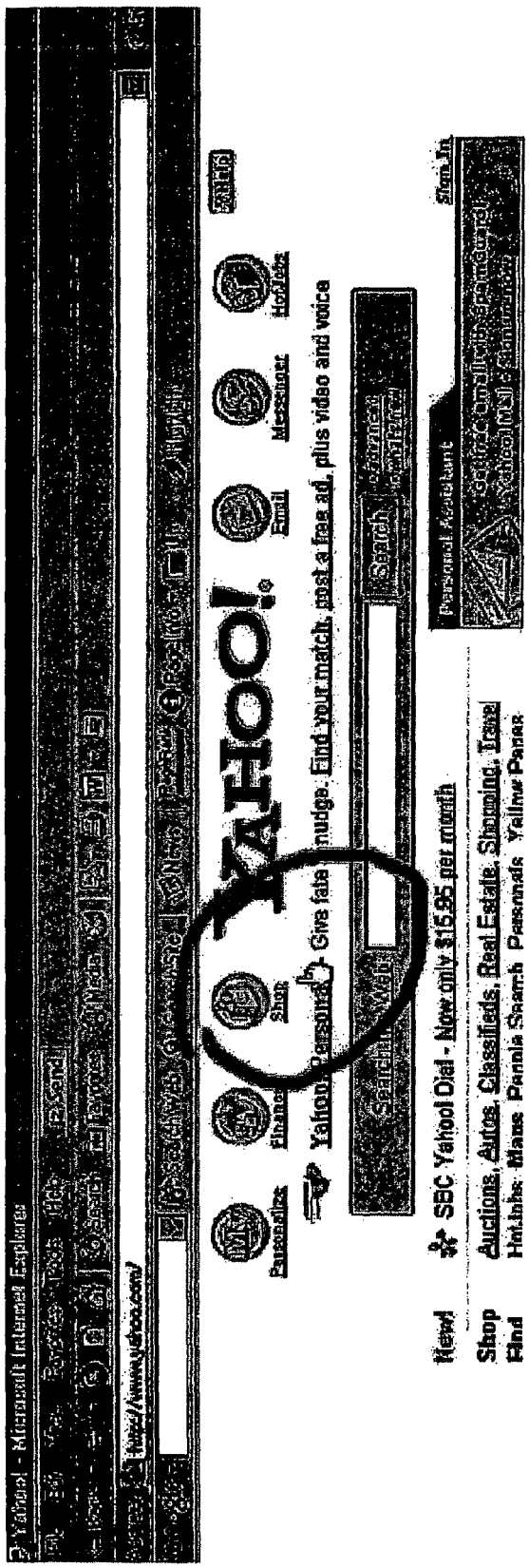
FIG. 13 depicts a sample website screen including a link to an interstitial advertisement provided through the system of the present invention.
Figure 14:
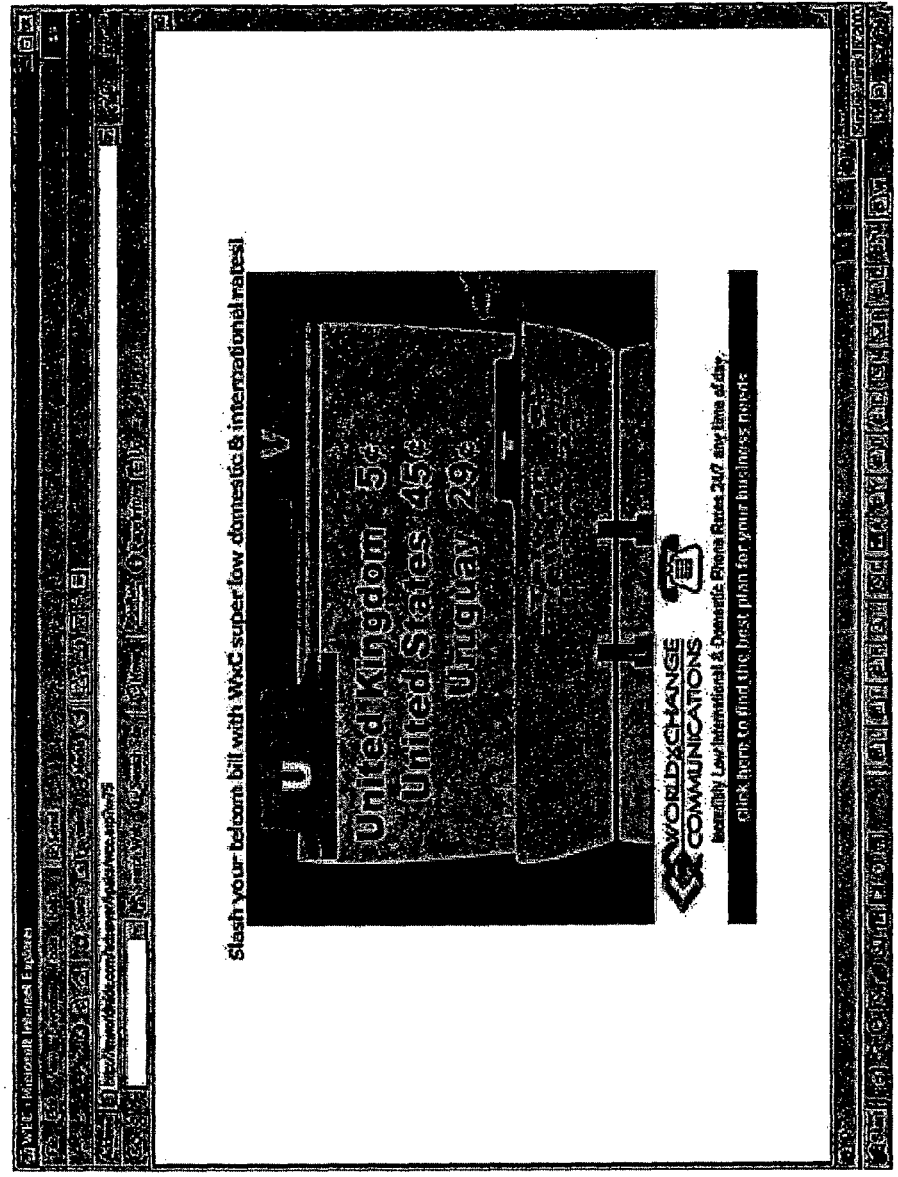
FIG. 14 depicts a sample interstitial advertisement as provided by the ad server of the system of the present invention.
Figure 15:
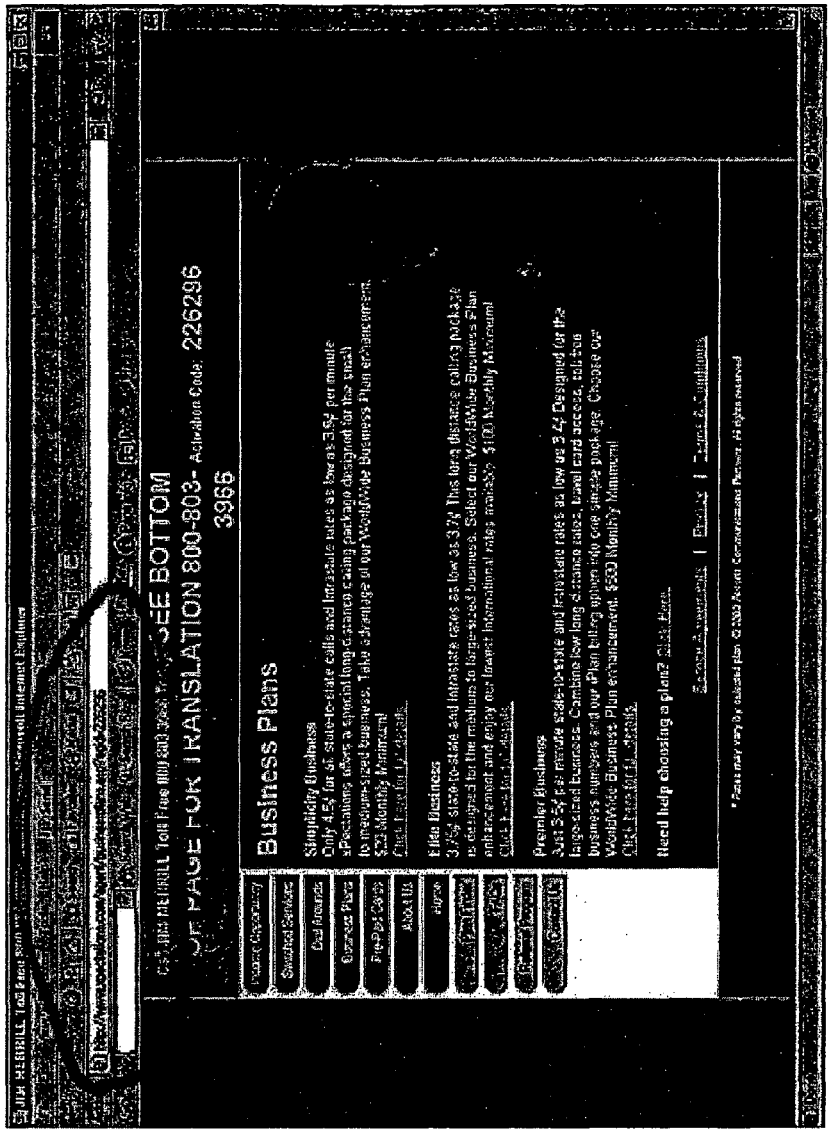
FIG. 15 depicts a sample advertiser's website screen accessed by clicking on a link provided in the interstitial advertisement.
Figure 16:
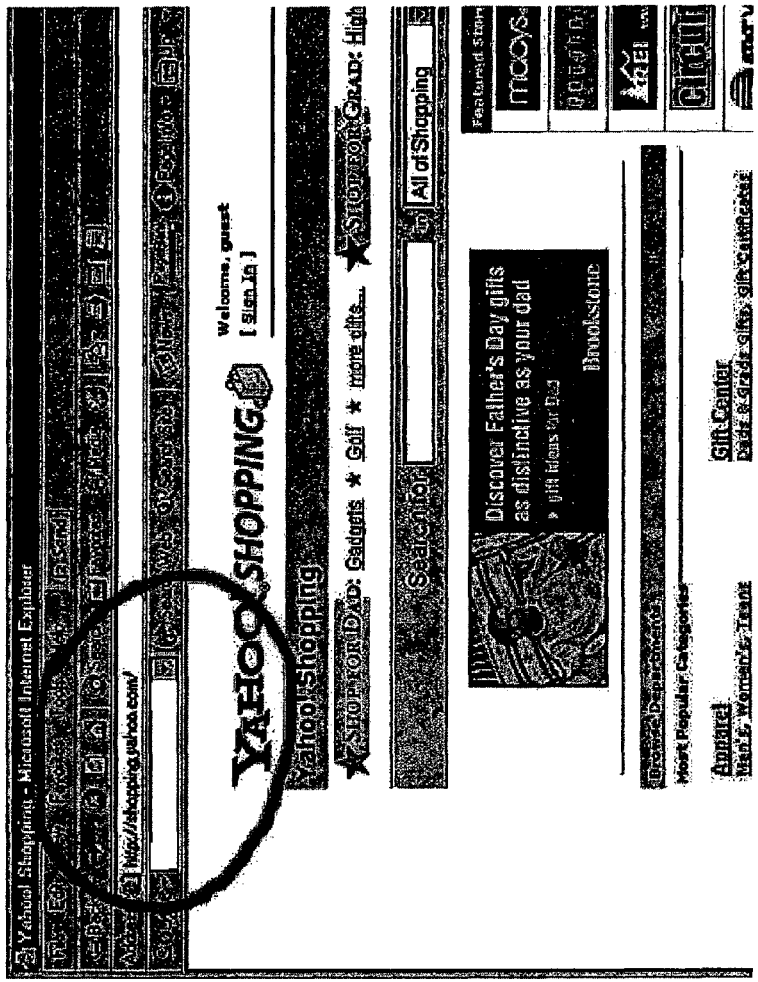
FIG. 16 depicts a sample website screen accessed through the system if the viewer of the interstitial advertisement skips the ad links and desires to return to the website in which the advertisement was placed.
Figure 17:
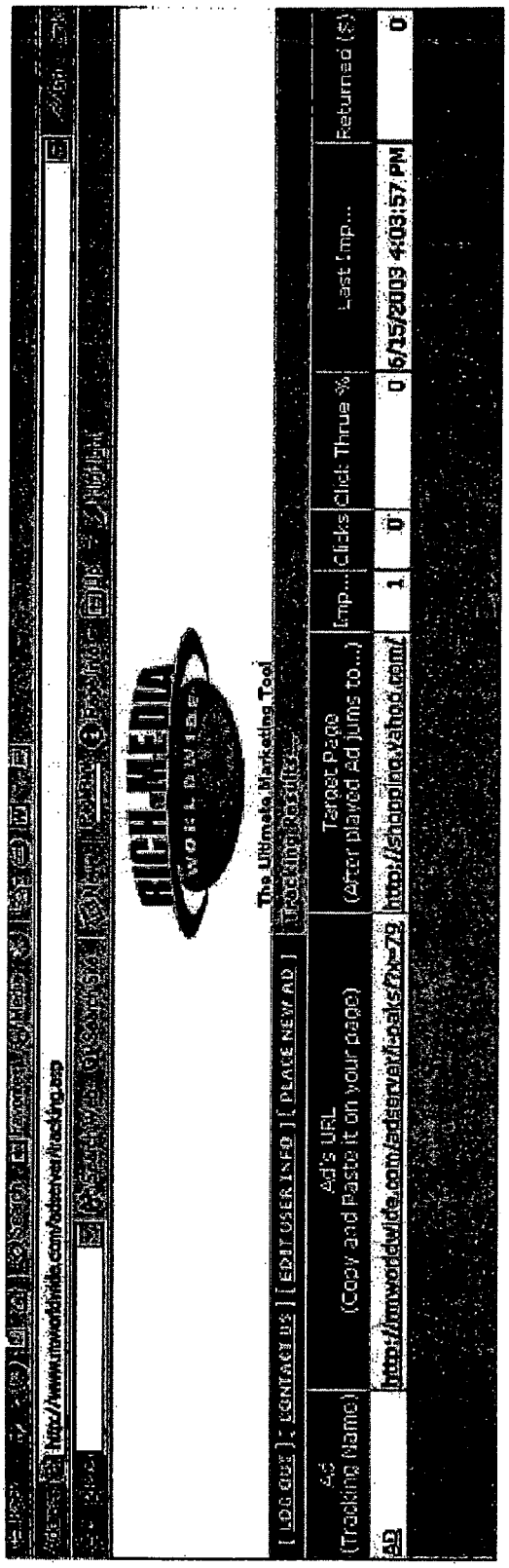
FIG. 17 depicts a sample system user interstitial advertisement click-through activity tracking screen updated to reflect user click-through data based on action by user as depicted in FIG. 16.

Referring to FIG. 12, the system provides a tracking screen for users to track website user click-through activity with respect to the ad. The screen shows the specific URL/data string assigned to the particular ad placement transaction parameters file stored in the dispatcher server for that transaction. This URL/data string is what is placed on the actual website where the ad is going to be displayed. FIG. 13 depicts a sample link on a website that represents such a URL/data string. FIG. 14 depicts the ad displayed to a website user that clicks on a link such as that represented in FIG. 13 during the interstitial period occurring after such link is clicked on by the website user. FIG. 15 depicts a sample of an advertiser page obtained when a website user clicks through an interstitial advertisement after viewing it, to obtain additional information. FIG. 16 depicts the "go-to" page displayed to the website user if he/she skips or takes no action on the ad. FIG. 17 depicts a sample tracking screen updated to reflect user click-through activity and ad impression counts after an ad is displayed to a website user who decided not to click-through the ad to access the advertiser's web page.

Multi-Level Advertising Business Method Using Interstitial Ad Server System

Figure 18:
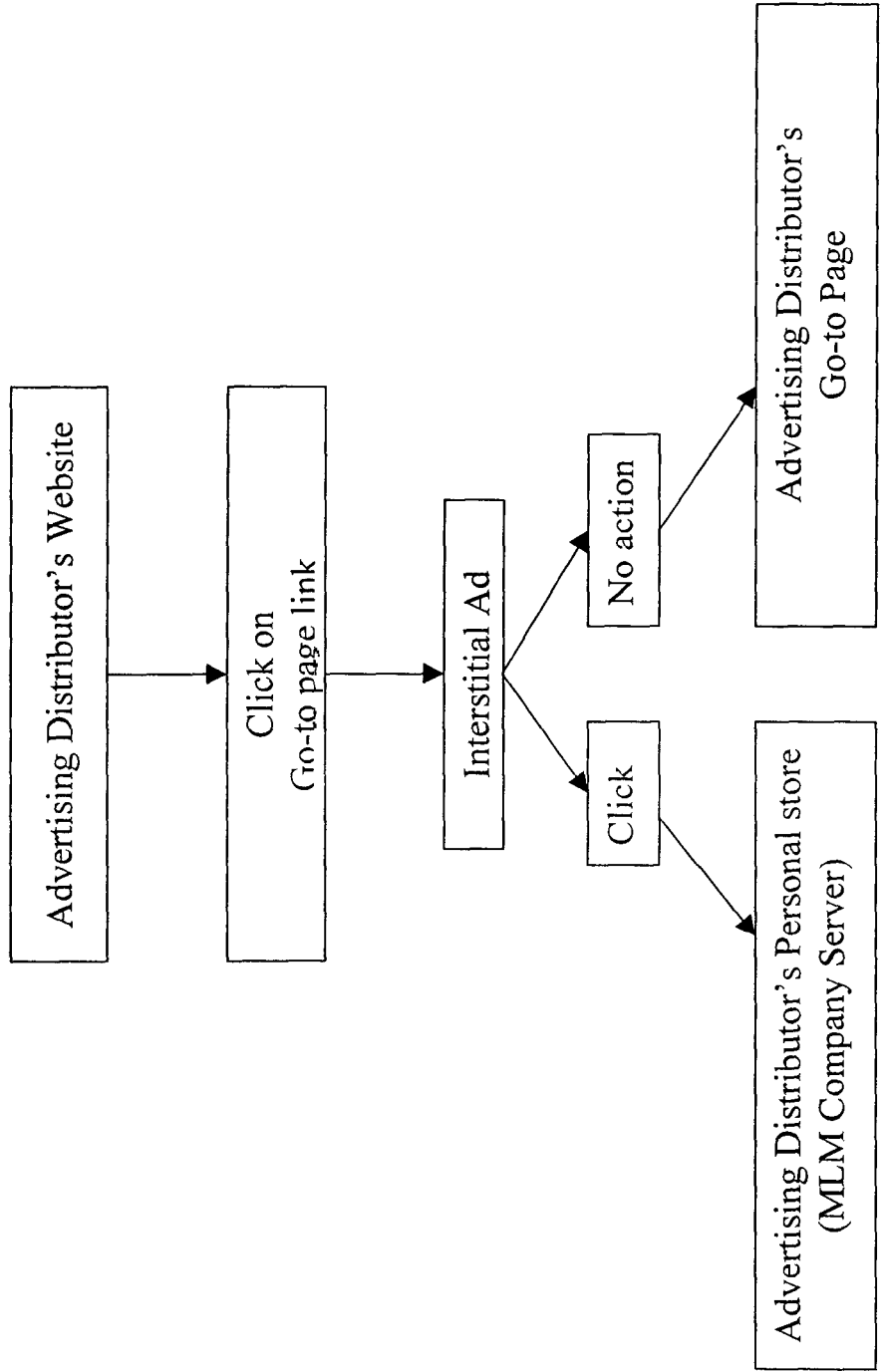
FIG. 18 depicts the website user's click-through flow in a multi-level marketing implementation of the present invention.

With the system of the present invention, an Internet merchant can benefit from online interstitial advertising by finding advertising distributors to set themselves up as a product distributor in the merchant's down-line in a multi-level marketing business method. Those advertising distributors preferably are provided with a personalized online store website URL courtesy of the merchant, and place the Internet merchant's interstitial ad on the advertising distributor's website using the system of the present invention. This advertisement can then be linked to the downline advertising distributor's personal online store. Preferably, the website to which an advertisement viewer is directed for sales of the advertised product or service is a dedicated website that is accessed only by website users that viewed the ad at a point in time prior to making a purchase transaction via said site, even if the website user makes such purchase by accessing the online store site directly after obtaining the address for said online store from the advertisements. This permits accurate tracking of sales attributable to the ad placed on the downstream distributor's website. FIG. 18 depicts the website user click-through flow in a multi-level advertising business method implementation of the present invention.

Figure 21:
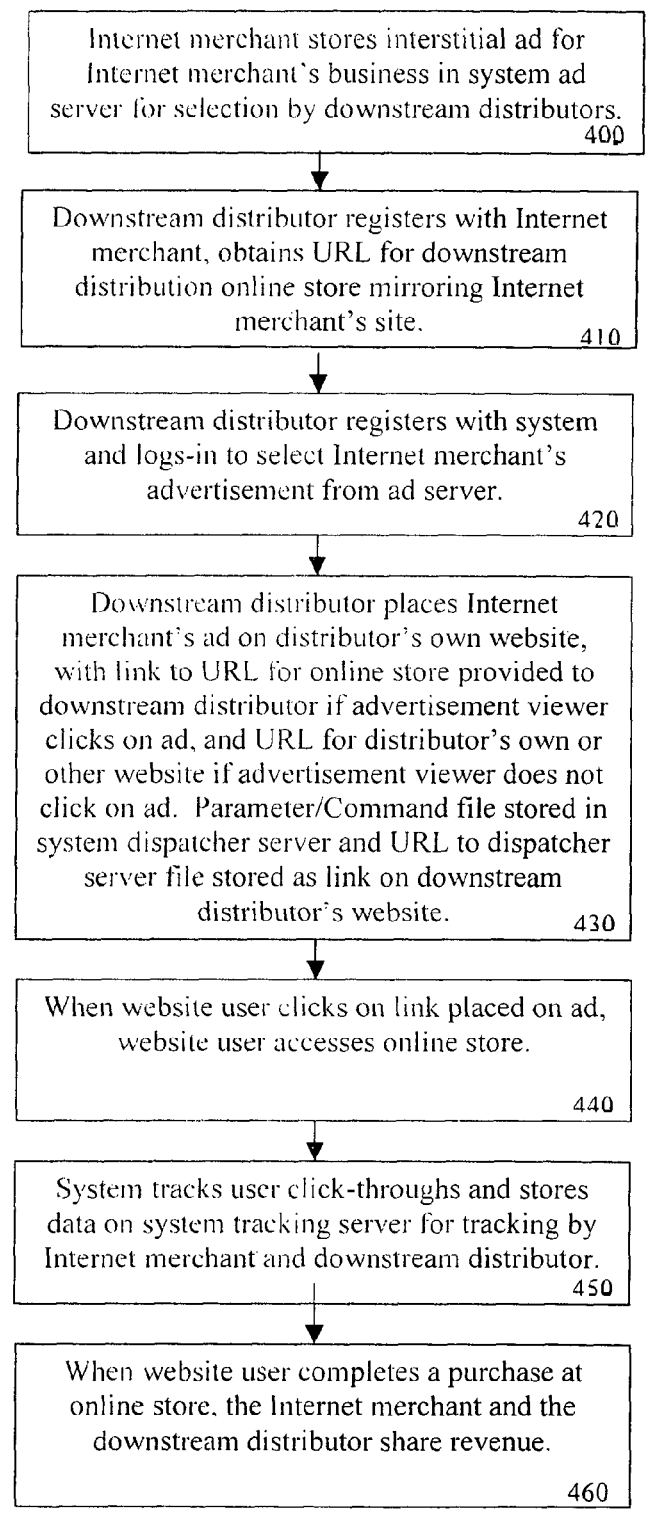
FIG. 21 depicts the process flow of a multi-level marketing implementation of the present invention.

Referring to FIG. 21, which depicts the process flow in a multi-level advertising business method implementation of the present invention, an Internet merchant preferably will have already stored its interstitial advertisement files in the system ad server for selection by downstream distributors 400. Downstream distributors register as distributors with the Internet merchant and obtain the uniform resource locator address for the designated downstream distribution online store which can be a mirror of the Internet merchant's site 410. The downstream distributor then registers with the system and selects the Internet merchant's ad file(s), entering the downstream distributor's website uniform resource locator address as the address for the website where the Internet merchant's interstitial ad will be placed 420. The downstream distributor enters the uniform resource locator address for the online store website as the designated site to which viewers of the Internet merchant's interstitial ad will be directed if the ad is clicked on by the viewer, as well as the address for the desired go-to page to which viewers of the ad are directed if they don't click to access the online store site. Such parameters are stored as a parameter/command file in the dispatcher server and the uniform resource locator address for such dispatcher server file is then stored as a link on the downstream distributor's website 430. When a website user clicks on said link they see the selected ad. When a website user clicks on a link placed in the ad, the website user accesses the online store. Sales attributable to the ad occur only at the online store site at the URL provided by the Internet merchant 440. The system tracks user click-throughs and stores data on the system's tracking server for tracking by the Internet merchant and the downstream distributor 450. When the website user completes a purchase on the online store, the Internet merchant and the downstream distributor can share revenues generated from the sale 460.

With this method trust is no longer an issue because the sales from the dedicated online store website can be easily monitored by them without any outside assistance. The Internet merchant who placed the advertiser/distributor below them in their down line can monitor the sales and commissions they are earning as a result of the interstitial advertisement by visiting the online store website. In fact, the merchant online store owner and the advertiser can be one and the same such that the need to track revenue attributable to each ad is reduced, although such tracking is still possible.

Figure 19:
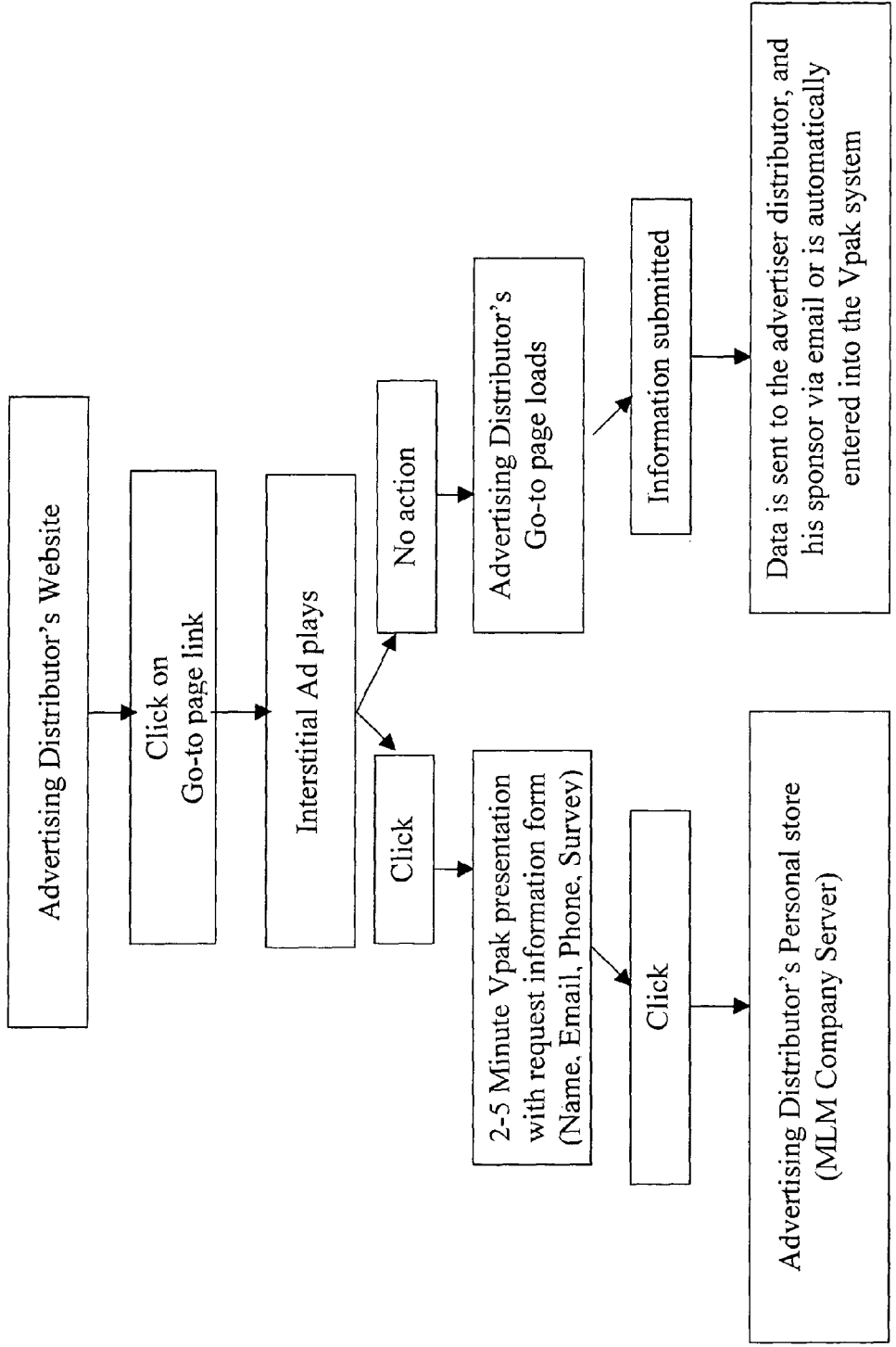
FIG. 19 depicts the website user's click-through flow in a multi-level marketing implementation of the present invention also incorporating delivery of post-advertisement sales and marketing materials.
Figure 20:
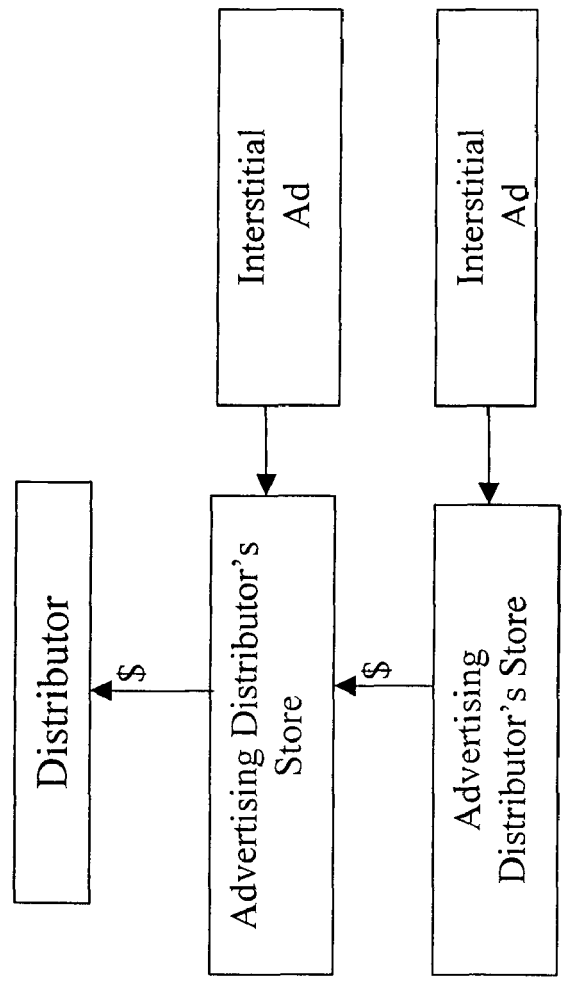
FIG. 20 depicts the revenue stream flow of a multi-level marketing implementation of the present invention.

The present invention can be combined with the system and method for creating and sending customized rich media marketing and sales materials as disclosed in commonly owned published U.S. non-provisional patent application Ser. No. 10/417,478 filed on Apr. 17, 2003, the specification and figures of which are incorporated herein by reference, to market and pursue prospects that enter their email address into interstitial advertising promotions. These leads can then be cultivated by using the marketing and sales material helper tool. FIG. 19 depicts the website user click-through flow in a multi-level advertising business method implementation of the present invention including providing such additional materials to the website user.

Internet merchants can provide their existing interstitial advertisement content as well as other television, print and streaming rich media electronic presentations and materials, to the ad server system operator for conversion as necessary and storage for use later in placing interstitial advertisements.

Additional Embodiments

Additional embodiments of the system of the present invention include offering a complete advertiser/distributor franchise turnkey solution to merchants that would include the ad-dispatcher system and method of the present invention and an updateable and a scalable web-based e-commerce solution with a multi-level marketing or straight commission payout system, enabling merchants to increase the scale of their sales and marketing efforts by adding additional online store websites. With the optional addition of rich media interstitial ads, presentations and the marketing and sales-helper system as described in U.S. non-provisional patent application Ser. No. 10/417,478, a merchant would have all elements necessary to sell merchandise on the Internet and find advertisers to place adds to sell said merchandise. The present invention can be used with any scalable e-commerce solution, whether payouts are in a multi-level or straight payout commission structure, that includes a designated online store website with a unique reference identifier and/or URL to which ad viewers, are directed. The multi-level marketing commission structure has added benefit in that in motivates current advertiser distributors to find other advertiser distributors to be in their downstream so as to increase revenues with minimal effort. However the system and method can be employed to create a multilevel online store chain all controlled and operated by a single merchant.

Tracking

As noted previously, tracking functions can be performed using existing tracking methods, (by Double Click, for example) which are based on the idea of re-directing the user's request. With this method when the user clicks on an ad file with an imbedded URL the request first goes to a specific URL which contains a special script or application which calculates these requests and then after executing this sends the user to the requested destination. This method slows down the user's experience and Internet performance because the user is connected to the tracking server first, then from the tracking server to the destination server, and the performance of the tracking server becomes an issue.

In a preferred embodiment of the present invention, these actions are split and independent from each other. When the website user clicks or requests a page from a website, the user directly accesses the preprogrammed interstitial ad while a query string is independently sent to the tracking server from the ad. The performance of the tracking server cannot affect the website user's experience, and reliability is increased because the execution of these two actions is not dependent on each other. This query string, or its result, can contain or generate all the necessary information for statistical calculation, including time of action, IP address of all desired go-to pages and does not require any communication back from the user to the server, which can compromise the user's privacy. A non-conversational message can be sent right from HTML part of the web page at the moment when the page is loaded in the web browser. A standard HTML tag is used, which holds images in the document body <img src="">. Instead of using the URL for the image, the system uses the URL for the active server page, which recognizes URL parameters as a tracking string and executes storing and executes storing received data in database.

Multiple tracking data can be obtained as the website user continues to click on additional ad files provided at a website.

Server Side Data Sharing

With conventional methods data sharing on the Internet involves a two-way communication between one or multiple users and a server. As described earlier, this two-way communication opens the customer's computer to the public and slows down the performance of the data sharing. In a preferred embodiment of the present invention, a system user sends his data one way to the dispatcher. The data is then generated to an .swf file which can be grabbed by another user from the Internet, adjusted, then sent back to the server to be generated and gabbed again. This method of data transfer is safer and faster, and works well with any application where data sharing is necessary, such as distance learning, games, banking, etc.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative and other embodiments may be selected without departing from the spirit and scope of the present invention.

What is claimed is:

1. A method for placing electronic advertisements comprising the following steps:

Providing a user interface via a computer system communicating with an electronic communications network for an advertiser to select a record of data representing a content file previously stored in electronic format in a content file storage location at a content server of a computer system communicating with said electronic communications network, for presentation of said content file as an advertisement to a user of a website, said website communicating via said electronic communications network and located remotely from said user interface and said content server, said website user having a computer communicating with said website via said electronic communications network, storing as a record in a database of a dispatcher server that does not reside at said website user's computer or on said website the uniform resource locator address for said storage location where said electronic content file is stored as well as a uniform resource locator address for a go-to web page where said website user will be directed if said user skips or does not act on said advertisement to request additional information and a uniform resource locator address for a go-to web page where said website user will be directed if said website user acts on said advertisement to request additional information and the parameters/commands to retrieve said one or more selected electronic content files from said content server and present said electronic content files as an advertisement to said website user without requiring downloading of said electronic content files into browser cache memory of said website user's computer for storage in advance of a request for presentation of an advertisement, and generating for placement on a page on said website said uniform resource locator data string that, when acted upon by said website user, launches a said dispatcher server database-stored advertisement placement parameter/command record, which in turn executes to cause said selected electronic content file designated in said advertisement placement parameter/command record to be presented to said website user from said content file storage location as an advertisement file without requiring downloading of said content files into browser cache memory of said website user's computer for storage in advance of a request for presentation of said advertisement, and passes said go-to page parameters to said selected advertisement file, and then directing said website user to one of said go-to web pages depending on said website user's activity with respect to said advertisement.

2. The method of claim 1, further comprising the step of tracking said presentation of said advertisement by causing a tracking query string to be sent by said advertisement file to a tracking server if said advertisement is presented to said website user.

3. The method of claim 1, wherein said uniform resource locator data string placed on said website page, when activated by action on said website page by said website user, accesses a said stored advertisement placement parameter/command record which causes a compiled file to be delivered to said website user, said compiled file accessing said electronic content file designated in said advertisement placement parameter/command record from said content server and presenting said electronic content file as said advertisement to said website user without requiring downloading of said advertisement file into browser cache memory of said website user's computer for storage in advance of a request for presentation of said advertisement.

4. The method of claim 1, further comprising the step of providing additional sales and marketing content files stored at a said content server to said website user after said advertisement has been presented to said website user by storing additional commands and parameters for retrieval and presentation of said additional sales and marketing content files in said parameter/command record stored in said dispatcher server database and causing said additional commands and parameters to be executed if said website user acts on said advertisement to request additional information.

5. A system for placement of electronic advertisements comprising:

a system-end computer communicating via an electronic communications network with system user computers, website operator-end computers and website user-end computers, a dispatcher server located remotely from said website operator-end computers and said website user-end computers and communicating with said system-end computer and said website user-end computers via said electronic communications network, containing a database storing advertisement placement transaction parameter and command records, an advertisement server communicating with said dispatcher server and said website user-end computers and having electronic content files stored thereon, a system software application providing a user interface for system user selection of one or more of said electronic content files for use as an advertisement, for designating a uniform resource locator address for a go-to web page where said website user will be directed if said website user skips or does not act on said advertisement to request additional information and a uniform resource locator address for a go-to web page where said website user will be directed if said website user acts on said advertisement to request additional information, and for storage as an advertisement placement parameter and command record within said database of said dispatcher server said uniform resource locator addresses for said go-to web pages, said location of said one or more selected electronic content files and the parameters and commands to retrieve said one or more selected electronic content files from said advertisement server and present said one or more selected electronic content files as an advertisement to a said website user without requiring downloading of said electronic content files into cache memory of said website user's computer, said system software application further generating a link for placement on a website, and a system-end software application that is executed when said link placed on said website is acted upon by said website user, receiving a request from said link on said website to process said parameters and commands stored in a said advertisement placement parameter and command record and cause said selected one or more electronic content files designated in said advertisement placement parameter and command record to be retrieved from said electronic content server and be presented to said website user without requiring downloading of said advertisement files into browser cache memory of said website user's computer for storage in advance of a request for presentation of said advertisement.

6. The system of claim 5, wherein said link for placement on said website comprises a data string with a uniform resource locator address for accessing a said advertisement placement parameter/command record stored at said dispatcher server database and said link is activated when said website user acts on said website page where said link is placed.

7. The system of claim 5, wherein tracking parameters are stored in said advertisement placement parameter/command record and further comprising a tracking server for tracking of said website user's activity with respect to said advertisement, said tracking server receiving a query string sent by said advertisement file with tracking data collected based on said tracking parameters stored in said advertisement placement parameter/command record and passed to said advertisement file.

8. The system of claim 5, wherein said system software applications further provide a system user template for creating parameter/command record uniform resource locator address data strings for placement as a link on said website.

9. The system of claim 5, wherein said system software applications further provide for tracking electronic commerce transactions conducted by said website user if said website user, in response to said advertisement, proceeds to conduct an electronic commerce transaction for products or services advertised in said advertisement.

10. The system of claim 5, wherein said system software applications further provide for processing an electronic commerce transaction with a said website user who accesses a said go-to page via said advertisement to engage in said electronic commerce transaction for products or services advertised in said advertisement.

11. The system of claim 5, wherein said system software applications provide an interface for system users to create customized sales and marketing materials for delivery to said website user that is presented said advertisement and requests additional information relating to said advertisement and for said system users to store the uniform resource locator address for said sales and marketing materials as part of said advertisement placement transaction parameter/command record stored within said database of said dispatcher server.

12. A multi-level marketing business method operating via an electronic communications network comprising the steps of:

providing one or more electronic advertisement files pertaining to a merchant's product or service for use as an advertisement accessed via a distributor website, said product or service being made available for purchase via electronic commerce at an online store website, said one or more electronic advertisement files being previously stored in electronic file format in a computer system having an electronic communications advertisement file server, storing a uniform resource locator address for said online store website to which a website user that views an electronic advertisement accessed via said distributor website will be directed for purchases of said product or service advertised in said advertisement, and a uniform resource locator address for a go-to web page where said website user is directed if said website user does not proceed to said online store website, and the uniform resource locator address for said one or more advertisement files stored at said advertisement file server as a parameter/command record in a database within a dispatcher server that does not reside at said website user's computer browser cache, generating for placement on said distributor website a link with a uniform resource locator address for accessing a said parameter/command record stored on said dispatcher server, said link, when said website user reaches said website page wherein said link is placed and acts upon said link, launching a said dispatcher server parameter/command record, which in turn causes said selected one or more advertisement files designated in said parameter/command record to be loaded from said advertisement file server and be presented to said website user as an advertisement without requiring downloading of said one or more advertisement files into browser cache memory of said website user's computer for storage in advance of a request for presentation of said advertisement, and directs said website user to said online store website or to said go-to web page depending upon said website user's action with respect to said advertisement, and sharing between said merchant and said distributor revenues generated from a purchase of a said product or service by said website user that views said advertisement via said distributor website and then proceeds to said online store website to complete said purchase.

13. The method of claim 1, wherein said step of selecting a record of data representing an electronic content file comprises selecting two or more records of data representing two or more electronic content files and wherein said two or more electronic content files are presented as a combined advertisement to said website user.

14. The method of claim 13, wherein said electronic content files may be stored in two or more different storage locations located remotely from each other and remotely from said website location and remotely from said dispatcher server.

15. The method of claim 1, wherein said advertisement is delivered by said dispatcher server as a file including encoding necessary to load said electronic content files from said content server for presentation as said advertisement to said website user and pass to said file said parameters and commands stored in said advertisement parameter/command placement record to direct said website user to a said go-to page and send tracking data to a tracking server.

16. The system of claim 5, wherein said system software application allows system users to select two or more electronic content files for use in combination as an advertisement to be rendered in said designated website interstitial space.

17. The system of claim 16, wherein said two or more electronic content files are stored in two or more different electronic content servers located remotely from each other and located remotely from said website computer and remotely from said dispatcher server.

18. The method of claim 1, further comprising the step of tracking said website user's activity with respect to said advertisement after said advertisement has been presented to said website user by causing a query string to be sent by said advertisement file to a tracking server after said advertisement is presented to said user and further website user activity occurs with respect to said advertisement.

19. The system of claim 5, wherein said system-end software application that is executed when said link placed on said website is acted upon by said website user processes said parameters and commands from said stored advertisement placement parameter/command record and causes a compiled file to be delivered to said website user computer, said compiled file then retrieving said electronic content file from said content server and assembling and presenting said selected electronic content file as said advertisement to said website user without requiring downloading of said advertisement files into browser cache memory of said website user's computer for storage in advance of a request for presentation of said advertisement.

20. The system of claim 7, wherein said advertisement file establishes a direct connection via said electronic communications network with said tracking server to deliver a tracking query string as a one-way non-conversational communication without requiring a browser application to deliver said query string.

21. The method of claim 2, wherein said advertisement file establishes a direct connection via said electronic communications network with said tracking server to deliver said tracking query string as a one-way non-conversational communication without requiring a browser application to deliver said query string.

22. The method of claim 1, further comprising the step of tracking said website user's activity with respect to said advertisement by causing a query string to be sent by said advertisement to a tracking server after said advertisement is rendered to said user and further website user activity occurs with respect to said advertisement, said query string being sent as a one-way non-conversational communication established directly between said advertisement and said tracking server without requiring a browser application to deliver said query string.

23. The system of claim 5, wherein said advertisement is delivered by said dispatcher server as a file including encoding necessary to load said electronic content files for presentation as an advertisement to said website user and pass to said file said parameters and commands stored in said advertisement parameter/command placement record to direct said website user to a subsequent page and send tracking data to a tracking server, and further comprising a tracking server for receipt of said tracking data.

24. A website advertisement method comprising:
Providing a user interface of a computer system communicating with an electronic communications network for receiving a designation of:
an electronic content file to be displayed as an advertisement to a website user, said website user having an electronic communications device with a browser application for accessing and viewing websites and communicating with said electronic communications network, said electronic content file being stored in electronic format in a content file storage location at a content server communicating with said electronic communications network,
a go-to page to which said website user will be directed after said electronic content file is presented to said website user if said website user acts on said advertisement to obtain further information relating to said advertisement, and
a go-to page to which said website user will be directed if said website user does not act on said advertisement to obtain further information relating to said advertisement;
storing as a parameter and command record in a relational database of a dispatcher server communicating with said electronic communications network, said dispatcher server not residing in said website user's electronic communications device:
an address for said electronic content file storage location where said electronic content file is stored,
an address for said go-to page to which said website user will be directed after said electronic content file is presented to said website user if said website user acts on said advertisement to obtain further information relating to said advertisement,
an address for said go-to page to which said website user will be directed if said website user does not act on said advertisement to obtain further information relating to said advertisement,
and one or more custom tracking parameters;
generating a data string including a uniform resource locator address for accessing said stored parameter/command record for placement at said website,
placing said data string at said website at a web page to be accessed by said website user before said advertisement is to be presented,
receiving and processing via said computer system a request to said dispatcher server in response to said website user acting upon said data string, causing a said parameter/command record stored at said dispatcher server database to be accessed and for said stored parameters/commands to be executed, causing an advertisement file to be presented to said website user without requiring said electronic content file designated in said parameter/command record to be downloaded into browser cache memory of said website user's electronic communications device in advance of said request, said execution of said parameter/command record causing said electronic content file to be loaded from said electronic content file storage location and for said go-to page and custom tracking parameters to be passed to said advertisement file and causing said website user to be directed to said go-to page to which said website user is directed if said website user acts on said advertisement to obtain further information relating to said advertisement, or to said go-to page to which said website user is directed if said website user does not act on said advertisement to obtain further information relating to said advertisement, and sending tracking data pertaining to presentation of said advertisement and said website user's action with respect to said advertisement from said advertisement to a tracking server based on said one or more tracking parameters.

25. A system for advertising on electronic networks, comprising:
a system-end computer communicating via an electronic communications network with website-end computers and website user-end computers,
a dispatcher server located remotely from said website-end computers and said website user-end computers and communicating with said system-end computer containing a database storing advertisement placement transaction parameter/command records,
a content server communicating with said electronic network and communicating with said dispatcher server and said website user-end computers and having electronic content files stored thereon,
a system software application providing a user interface for system user selection of one or more of said electronic content files for use as an advertisement to be assembled and rendered to a website user, for designating a uniform resource locator addresses for a go-to web page to which a website user will be directed after presentation of said advertisement is requested, and for storage as an advertisement placement parameter/command record within said database of said dispatcher server said uniform resource locator addresses for said go-to web page, said location of said one or more selected electronic content files at said content server and the parameters/commands to retrieve said one or more selected electronic content files from said content server and present said one or more selected electronic content files as an advertisement to a said website user without requiring downloading of said electronic content files into browser cache memory of said website user's computer for storage in advance of a request for presentation of said advertisement and provide tracking data relating to said presentation of said advertisement to said website user,
said system software application further generating said link for placement on said website comprising a uniform resource locator address data string for accessing said advertisement placement parameter/command record stored at said dispatcher server database,
a system-end software application that is executed when said link placed on said website is acted upon by said website user, causing a said parameter/command record stored at said dispatcher server database to be retrieved and for said stored parameters/commands to be executed, causing an advertisement file to be presented to said website user without requiring downloading of said advertisement files into browser cache memory of said website user's computer for storage in advance of a request for presentation of said advertisement, said execution of said stored parameters/commands causing said one or more electronic content files to be loaded from said electronic content file storage location at a said content server where said one or more electronic content files are stored and for said go-to page and tracking parameters to be passed to said advertisement file to present said one or more electronic content files to said website user as an advertisement without requiring downloading of said advertisement's electronic content files into browser cache memory of said website user's computer for storage in advance of a request for presentation of said advertisement, and directing said website user to said go-to page, and sending tracking data pertaining to presentation of said advertisement and said website user's action with respect to said advertisement from said advertisement file to a tracking server based on said one or more tracking parameters; and a tracking server for receiving said tracking data.

26. The system of claim 25, wherein said system software applications further provide a system user template for creating parameter/command file uniform resource locator address data strings for placement as a link on said website.

27. The system of claim 25, wherein said system software applications further provide for tracking electronic commerce transactions conducted by said website user if said website user, in response to said advertisement, proceeds to conduct an electronic commerce transaction for products or services advertised in said advertisement.

28. The system of claim 25, wherein said system software applications further provide for processing an electronic commerce transaction for products or services advertised in said advertisement with said website user who accesses a said go-to page via said advertisement to engage in said electronic commerce transaction.

29. The system of claim 25, wherein said advertisement file is delivered by said dispatcher server as a file including encoding necessary to load said electronic content files for presentation as an advertisement to said website user and pass to said file said parameters and commands stored in said advertisement parameter/command placement record to direct said website user to a said go-to page and send tracking data from said file to a tracking server.

30. The system of claim 25, wherein said system software applications provide an interface for system users to create customized sales and marketing materials for delivery to said website user that is presented said advertisement and requests additional information relating to said advertisement and for said system users to store a uniform resource locator address for said sales and marketing materials as part of said advertisement placement transaction parameter and command record stored within said database of said dispatcher server.

31. A multi-level marketing business method implemented using the system of claim 25 comprising the steps of providing one or more electronic advertisement files pertaining to a merchant's product or service for use as an advertisement accessed via a distributor website, said merchant providing an online store website for sale of said product or service via electronic commerce, said one or more electronic advertisement files being previously stored in electronic file format in an advertisement file server, storing a uniform resource locator address for said online store website to which a website user that views said electronic advertisement on said distributor website will be directed for a purchase of said product or service advertised in said advertisement, and a uniform resource locator address for a go-to web page where said website user will be directed if said website user does not proceed to said online store website, and a uniform resource locator address for each of said one or more advertisement files stored at said advertisement file server as a parameter/command file in said dispatcher server database, generating a link for placement on said distributor website, said link comprising a uniform resource locator address corresponding to said parameter/command record stored on said dispatcher server, said link, when said website user reaches said website page wherein said link is placed and acts upon said link, launching said dispatcher server parameter/command record, which in turn causes said one or more advertisement files to be retrieved from said advertisement content server and be displayed to said website user as an advertisement, and directs said website user to said designated online store website or to said designated go-to web page depending upon said website users action with respect to said advertisement, and sharing between said merchant and said distributor revenues generated from a purchase of a product or service by said website user that views said advertisement via said distributor website and then proceeds to said online store website to complete said purchase.

32. The system of claim 25, further comprising a database storing one or more content files for use in creating an electronic marketing and sales presentation, and said user interface application provides an interface for system users to select one or more of said content files from said database for creation of a customized sales and marketing presentation for delivery to said website user after being presented said advertisement and requesting further information relating to said advertisement, via an electronic mail addressed to said website user.

33. The system of claim 32, wherein said email to said website user causes said sales and marketing presentation to be delivered via a data string placed in said electronic mail representing said selected content files stored in said database constituting said marketing and sales presentation and a URL attached thereto representing said custom server-based application, that in response to action with respect to said electronic mail at said website user/electronic mail recipient end, causes a file to be delivered to said website user at said website user's electronic mail address, said file causing said selected one or more sales and marketing presentation content files to be retrieved, assembled and presented to said website user/electronic mail recipient as said sales presentation within said file, and substantially simultaneously causes a non-conversational message comprising a data string with tracking data pertaining to said website user's activity with respect to said sales presentation to be sent from said file to said tracking server.

34. The method of claim 12, wherein said online store website is a mirror site of a said merchant's website.

35. The method of claim 31, wherein said online store website is a mirror site of a said merchant's website.

* * * * *